(12) United States Patent
Takano

(10) Patent No.: US 10,200,174 B2
(45) Date of Patent: *Feb. 5, 2019

(54) COMMUNICATION SYSTEM, COMMUNICATION CONTROL METHOD, MOBILE TERMINAL AND RELAY DEVICE

(71) Applicant: SONY CORPORATION, Tokyo (JP)

(72) Inventor: Hiroaki Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 14/886,643

(22) Filed: Oct. 19, 2015

(65) Prior Publication Data

US 2016/0044741 A1 Feb. 11, 2016

Related U.S. Application Data

(63) Continuation of application No. 14/615,209, filed on Feb. 5, 2015, now Pat. No. 9,191,096, which is a (Continued)

(30) Foreign Application Priority Data

Jul. 23, 2009 (JP) .................................. 2009-172492

(51) Int. Cl.
*H04W 52/02* (2009.01)
*H04L 5/00* (2006.01)
(Continued)

(52) U.S. Cl.
CPC ........... *H04L 5/0051* (2013.01); *H04B 7/155* (2013.01); *H04B 7/15557* (2013.01);
(Continued)

(58) Field of Classification Search
None
See application file for complete search history.

(56) References Cited

U.S. PATENT DOCUMENTS 6,718,159 B1 4/2004 Sato
7,477,695 B2 1/2009 Takano
(Continued)

FOREIGN PATENT DOCUMENTS

CN 1263396 A 8/2000
CN 1902868 A 1/2007
(Continued)

OTHER PUBLICATIONS

Dahlman, E., et al., "3G Evolution: HSPA and LTE for Mobile Broadband", pp. 314-315, (2007).
(Continued)

*Primary Examiner* — Saumit Shah
(74) *Attorney, Agent, or Firm* — Xsensus, LLP

(57) ABSTRACT

A communication system is configured that includes a mobile terminal, one or more relay devices, and a base station for communicating with the mobile terminal via any of the one or more relay devices, where the mobile terminal includes a reception unit for receiving a reference signal transmitted from the one or more relay devices, a determination unit for determining a relay device to be used for communication with the base station based on the reference signal received by the reception unit from the one or more relay devices, and a transmission unit for transmitting to the base station information indicating the relay device determined by the determination unit.

13 Claims, 17 Drawing Sheets

Related U.S. Application Data continuation of application No. 13/319,098, filed as application No. PCT/JP2010/059852 on Jun. 10, 2010, now Pat. No. 8,983,556.

(51) Int. Cl.

| | | |
|---|---|---|
| *H04B 7/155* | (2006.01) | |
| *H04L 12/12* | (2006.01) | |
| *H04W 64/00* | (2009.01) | |
| *H04W 76/28* | (2018.01) | |
| *H04W 40/22* | (2009.01) | |
| *H04W 72/02* | (2009.01) | |
| *H04W 72/08* | (2009.01) | |
| *H04W 84/04* | (2009.01) | |

(52) U.S. Cl.
CPC ......... *H04L 12/12* (2013.01); *H04W 52/0206* (2013.01); *H04W 64/00* (2013.01); *H04W 64/003* (2013.01); *H04W 76/28* (2018.02); *H04W 40/22* (2013.01); *H04W 72/02* (2013.01); *H04W 72/085* (2013.01); *H04W 84/047* (2013.01); *Y02D 70/1262* (2018.01); *Y02D 70/1264* (2018.01); *Y02D 70/164* (2018.01); *Y02D 70/24* (2018.01); *Y02D 70/25* (2018.01); *Y02D 70/39* (2018.01); *Y02D 70/446* (2018.01)

(56) References Cited

U.S. PATENT DOCUMENTS

| | | | |
|---|---|---|---|
| 7,620,114 B2 | 11/2009 | Takano | |
| 7,627,045 B2 | 12/2009 | Takano | |
| 7,680,461 B2 | 3/2010 | Takano | |
| 8,000,421 B2 | 8/2011 | Takano et al. | |
| 8,983,556 B2 | 3/2015 | Takano | |
| 2004/0092275 A1* | 5/2004 | Krasner | G01S 11/08 455/502 |
| 2005/0141631 A1 | 6/2005 | Takano | |
| 2007/0019573 A1 | 1/2007 | Nishimura | |
| 2010/0157845 A1 | 6/2010 | Womack et al. | |
| 2011/0177823 A1 | 7/2011 | Miao et al. | |
| 2011/0223855 A1 | 9/2011 | Frenger et al. | |
| 2012/0094661 A1* | 4/2012 | Frenger | H04W 52/343 455/434 |

FOREIGN PATENT DOCUMENTS

| | | |
|---|---|---|
| CN | 1905401 A | 1/2007 |
| CN | 1918860 A | 2/2007 |
| CN | 101132601 A | 2/2008 |
| JP | 2000-224088 | 8/2000 |
| JP | 2000-224088 A | 8/2000 |
| JP | 2006-246202 A | 9/2006 |
| JP | 2006-254155 | 9/2006 |
| JP | 2006-254155 A | 9/2006 |
| JP | 2007-36423 | 2/2007 |
| JP | 2008-72251 | 3/2008 |
| JP | 2008-109198 A | 5/2008 |
| JP | 2008-235962 | 10/2008 |
| JP | 2009-94692 | 4/2009 |
| JP | 2009-093406 | 7/2009 |
| JP | 2009-159409 A | 7/2009 |
| WO | WO 2008-149598 A1 | 12/2008 |

OTHER PUBLICATIONS

International Search Report dated Jul. 20, 2010 in PCT/JP10/059852, filed Jun. 10, 2010.
Office Action dated Oct. 8, 2013 in Japanese Patent Application No. 2009-172492.
Combined Office Action and Search Report dated Dec. 10, 2013 in Chinese Application No. 201080031787.8 (with English translation).
Office Action dated Dec. 17, 2013 in Japanese Application No. 2009-172492.
Combined Chinese Office Action and Search Report dated Jul. 29, 2014 in Patent Application No. 201080031787.8 (with English translation).
Combined Chinese Office Action and Search Report dated Dec. 4, 2017 in corresponding Patent Application No. 201510568498.6 (with English Translation), 42 pages.

* cited by examiner (1)

COMMUNICATION SYSTEM, COMMUNICATION CONTROL METHOD, MOBILE TERMINAL AND RELAY DEVICE

CROSS REFERENCE TO RELATED APPLICATIONS

This application is a continuation of U.S. application Ser. No. 14/615,209, filed Feb. 5, 2015, which is a continuation of U.S. application Ser. No. 13/319,098, filed Nov. 7, 2011, now U.S. Pat. No. 8,983,556; the entire contents of which are incorporated herein by reference. U.S. application Ser. No. 13/319,098 is a National Stage of PCT/JP10/59852, filed Jun. 10, 2010, and claims the benefit of priority under 35 U.S.C. § 119 of Japanese Application No. 2009-172492, filed Jul. 23, 2009.

TECHNICAL FIELD

The present invention relates to a communication system, a communication control method, a mobile terminal, and a relay device.

BACKGROUND ART

In 3GPP (Third Generation Partnership Project), a technology that uses a relay device (relay station) to realize an increase in the throughput at the cell edge is being actively considered.

This relay device receives, in a downlink, a signal transmitted from a base station, amplifies the same, and then transmits the amplified signal to a mobile terminal. By performing such relaying, the relay device can increase the signal-to-noise ratio than when directly transmitting a signal from the base station to the mobile terminal. Similarly, in an uplink, the relay device can maintain high signal-to-noise ratio by relaying a signal transmitted from the mobile terminal to the base station.

Additionally, as a relay scheme of the relay device, an Amp-Forward type, a Decode-Forward type, and the like can be cited. The Amp-Forward type is a scheme of amplifying and transmitting a received signal while keeping it as an analogue signal. According to this Amp-Forward type, although the signal-to-noise ratio is not improved, there is an advantage that the communication protocol does not have to be refined. Additionally, the relay device has a feedback path between a transmission antenna and a reception antenna, and is designed such that the feedback path does not oscillate.

The Decode-Forward type is a scheme of converting a received signal to a digital signal by AD conversion, performing decoding such as error correction on the digital signal, encoding again the decoded digital signal, converting the digital signal to an analogue signal by DA conversion, amplifying the analogue signal, and transmitting the same. According to the Decode-Forward type, the signal-to-noise ratio can be improved by a coding gain. Also, by storing a digital signal obtained by reception in a memory and transmitting the digital signal in the next time slot, the relay device can avoid oscillation of a feedback path between a transmission antenna and a reception antenna. Additionally, the relay device is also capable of avoiding the oscillation by changing the frequency instead of the time slot.

Furthermore, since it is assumed that there are a plurality of relay devices present within the cell provided by a base station, it is effective from the standpoint of power consumption reduction to implement a power save mode (sleep mode) in the relay devices. Additionally, the power save mode in LTE (Long Term Evolution) is described in Non-Patent Literature 1, for example.

CITATION LIST

Non-Patent Literature

Non-Patent Literature 1: Erik Dahlman, Stefan ParkVall, et al, "3G Evolution: HSPA and LTE for Mobile Broadband", 2007, p. 314

SUMMARY OF INVENTION

Technical Problem

However, if relay devices operating in the power save mode do not transmit radio signals, a mobile terminal is not able to receive radio signals from the relay devices operating in the power save mode, and thus it is difficult to appropriately determine a relay device to be used for the communication between a base station and the mobile terminal.

Accordingly, the present invention is made in view of the above problem, and the object of the present invention is to provide a communication system, a communication control method, a mobile terminal, and a relay device which are novel and improved, and which are capable of determining a relay device to be used for the communication between the base station and the mobile terminal from one or more relay devices having a power save mode.

Solution to Problem

According to an aspect of the present invention, in order to achieve the above-mentioned object, there is provided a communication system including a mobile terminal, one or more relay devices, and a base station for communicating with the mobile terminal via any of the one or more relay devices, where the mobile terminal includes a reception unit for receiving a reference signal transmitted from the one or more relay devices, a determination unit for determining a relay device to be used for communication with the base station based on the reference signal received by the reception unit from the one or more relay devices, and a transmission unit for transmitting to the base station information indicating the relay device determined by the determination unit.

Each of the one or more relay devices may perform transmission of the reference signal in an active mode where relaying of communication between the base station and the mobile terminal is enabled and in a power save mode where intermittent reception is performed.

The base station may include a mode control unit for instructing, when information indicating the relay device is received from the mobile terminal, the relay device to shift to the active mode, in a case the relay device is operating in the power save mode.

Each of the one or more relay devices does not have to transmit the reference signal when operating in the power save mode and may transmit the reference signal when operating in the active mode, and the base station may include a terminal location acquisition unit for acquiring location information of the mobile terminal, a selection unit for selecting a relay device among the one or more relay devices based on the location information of the mobile terminal acquired by the terminal location acquisition unit, and a mode control unit for issuing an instruction to shift to the active mode, in a case the relay device selected by the selection unit is operating in the power save mode.

The terminal location acquisition unit may acquire the location information of the mobile terminal based on an arrival direction and a reception intensity of a signal transmitted from the mobile terminal.

The mobile terminal may transmit to the base station reception intensity information of each signal transmitted from a plurality of base stations, and the terminal location acquisition unit may acquire the location information of the mobile terminal based on the reception intensity information of each of the plurality of base stations received from the mobile terminal.

A plurality of base stations may transmit to the base station reception intensity information of a signal transmitted by the mobile terminal, and the terminal location acquisition unit may acquire the location information of the mobile terminal based on reception intensities of the signal transmitted by the mobile terminal at the plurality of base stations.

The mobile terminal may transmit to the base station reception intensity information of each signal transmitted from the base station and the one or more relay devices, and the terminal location acquisition unit may acquire the location information of the mobile terminal based on the reception intensity information received from the mobile terminal.

The mobile terminal may transmit to the base station the location information of the mobile terminal estimated by GPS, and the terminal location acquisition unit may acquire the location information of the mobile terminal transmitted from the mobile terminal.

According to another aspect of the present invention, in order to achieve the above-mentioned object, there is provided a communication control method including the steps of receiving, by a mobile terminal, a reference signal transmitted from one or more relay devices, determining a relay device to be used for communication with a base station based on the reference signal received from the one or more relay devices, and transmitting to the base station information indicating the relay device which has been determined.

According to another aspect of the present invention, in order to achieve the above-mentioned object, there is provided a mobile terminal including a reception unit for receiving a reference signal transmitted from one or more relay devices, a determination unit for determining a relay device to be used for communication with a base station based on the reference signal received by the reception unit from the one or more relay devices, and a transmission unit for transmitting to the base station information indicating the relay device determined by the determination unit.

According to another aspect of the present invention, in order to achieve the above-mentioned object, there is provided a relay device. The relay device relays communication between a mobile terminal including a reception unit for receiving a reference signal transmitted from one or more relay devices, a determination unit for determining a relay device to be used for communication with a base station based on the reference signal received by the reception unit from the one or more relay devices, and a transmission unit for transmitting to the base station information indicating the relay device determined by the determination unit, and the base station.

Advantageous Effects of Invention

As described above, according to the present invention, a relay device to be used for the communication between a base station and a mobile terminal can be determined from one or more relay devices having a power save mode.

DESCRIPTION OF EMBODIMENTS

Figure 1:
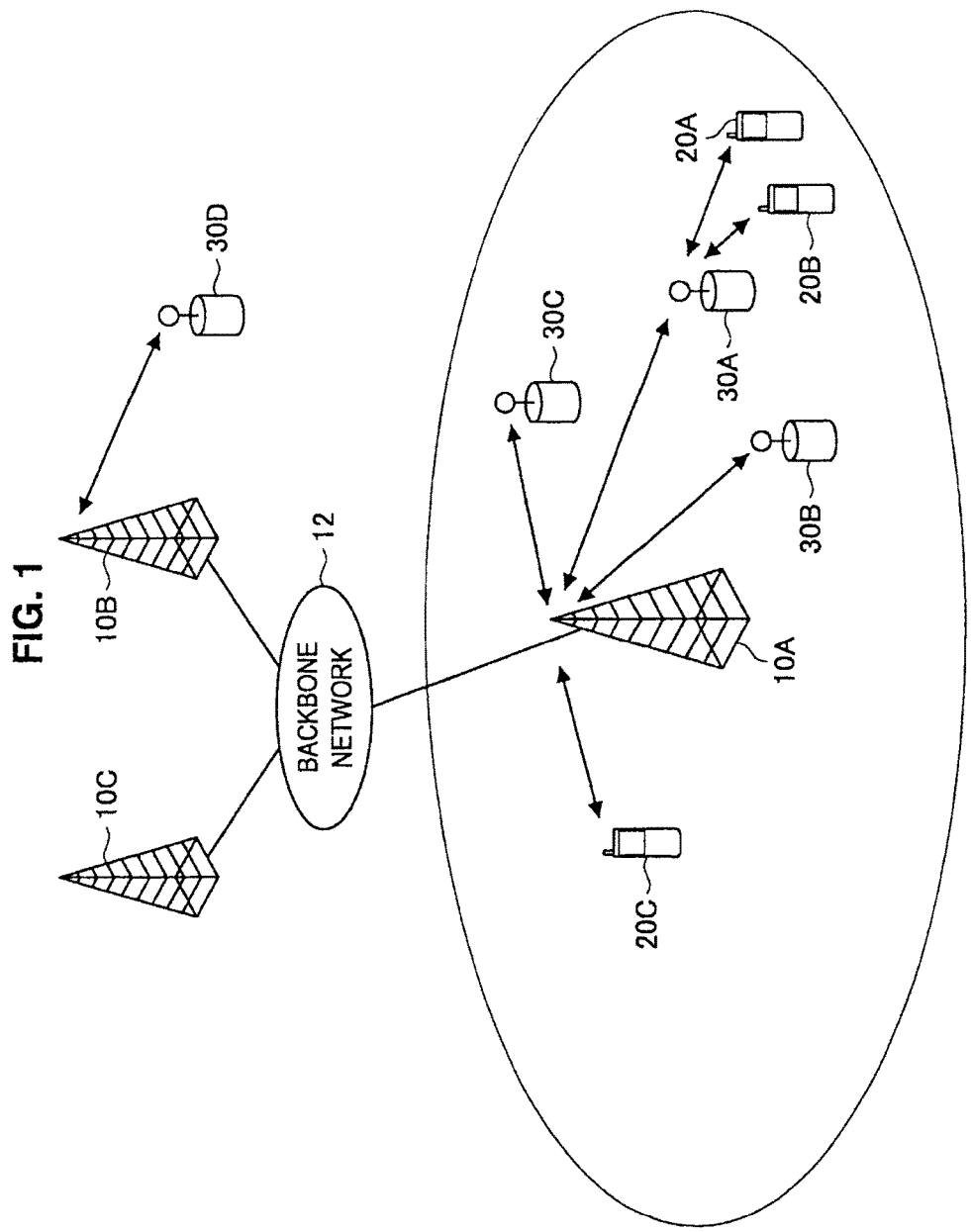
FIG. 1 is an explanatory diagram showing a configuration of a communication system according to an embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as mobile terminals 20A, 20B, and 20C. However, if it is not particularly necessary to distinguish each of a plurality of structural elements having substantially the same functional configuration, only the same reference numeral is assigned. For example, if it is not particularly necessary to distinguish between the mobile terminals 20A, 20B, and 20C, they are simply referred to as the mobile terminal 20.

Furthermore, the "Description of Embodiments" will be described according to the following item order.

1. Overview of Communication System
2. First Embodiment
2-1. Configuration of Relay Device
2-2. Configuration of Mobile Terminal
2-3. Configuration of Base Station
2-4. Operation of Communication System
3. Second Embodiment
3-1. Configuration of Relay Device
3-2. Configuration of Mobile Terminal
3-3. Configuration of Base Station
3-4. Operation of Communication System
3-5. Modified Example 1
3-6. Modified Example 2
3-7. Modified Example 3
3-8. Modified Example 4
   4. Summary 1. Overview of Communication System First, a communication system 1 according to an embodiment of the present invention will be briefly described with reference to FIGS. 1 to 4.

FIG. 1 is an explanatory diagram showing the configuration of the communication system 1 according to the embodiment of the present invention. As shown in FIG. 1, the communication system 1 according to the embodiment of the present invention includes a plurality of base stations 10A, 10B, and 10C, a backbone network (backhaul) 12, a plurality of mobile terminals 20A, 20B, and 20C, and a plurality of relay devices 30A, 30B, 30C, and 30D.

The plurality of base stations 10A, 10B, and 10C manage communication with the mobile terminals 20 that are present in their radio wave coverages. For example, the base station 10A manages a communication schedule for the mobile terminal 20C present in the radio wave coverage of the base station 10A, and communicates with the mobile terminal 20C according to this communication schedule.

Furthermore, the plurality of base stations 10A, 10B, and 10C are also capable of communicating with the mobile terminals 20 present in their radio wave coverages via the relay device 30. In this case, the plurality of base station 10A, 10B, and 10C manage the communication schedule for the relay device 30 and the communication schedule for between the relay device 30 and the mobile terminal 20. For example, the base station 10A manages the communication schedule for the relay device 30A present in the radio wave coverage of the base station 10A and the communication schedule for between the relay device 30A and the mobile terminals 20A and 20B.

Additionally, in the present specification, an explanation will be given on the management of the communication schedule, placing emphasis on centralized control performed by the base station 10, but the present invention is not limited to such an example. For example, the communication schedule may be managed by the relay device 30 (distributed scheduling).

Furthermore, the plurality of base stations 10A, 10B, and 10C are connected via the backbone network 12. The plurality of base stations 10A, 10B, and 10C are capable of exchanging various information for communication via this backbone network 12.

The relay device 30 relays the communication between the base station 10 and the mobile terminal 20. Specifically, in the downlink, the relay device 30 receives a signal transmitted from the base station 10, and transmits the amplified signal to the mobile terminal 20. By performing such relaying, the relay device 30 can increase the signal-to-noise ratio than when directly transmitting the signal from the base station 10 to the mobile terminal 20 near the cell edge.

Similarly, also in the uplink, the relay device 30 relays a signal transmitted from the mobile terminal 20 to the base station 10, and thereby maintains a high signal-to-noise ratio. Additionally, an example is shown in FIG. 1 where only the relay device 30A is present in the cell provided by the base station 10A, but a plurality of relay devices 30 may be present in the cell provided by the base station 10A. Link names will now be organized with reference to FIG. 2.

Figure 2:
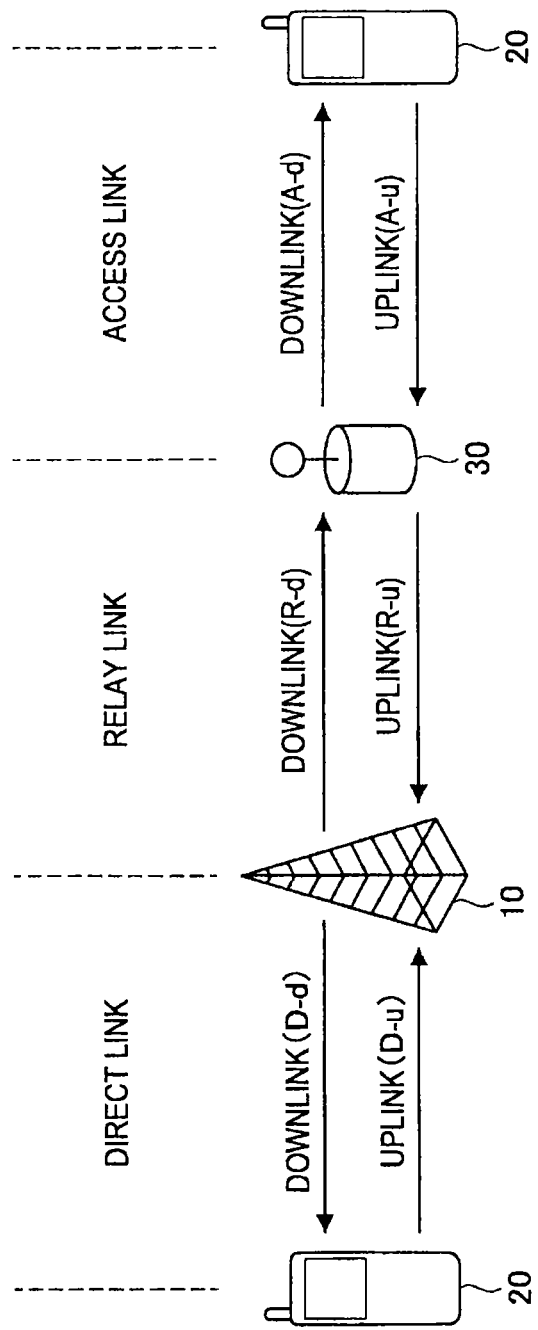
FIG. 2 is an explanatory diagram showing each link in the communication system according to the embodiment of the present invention.

FIG. 2 is an explanatory diagram showing each link in the communication system 1 according to the embodiment of the present invention. As shown in FIG. 2, a direct communication path between the base station 10 and the mobile terminal 20 is referred to as a direct link. Also, the communication path between the base station 10 and the relay device 30 is referred to as a relay link, and the communication path between the relay device 30 and the mobile terminal 20 is referred to as an access link.

As described above, the mobile terminal 20 communicates with the base station 10 directly or via the relay device 30. Additionally, as the data to be transmitted/received by the mobile terminal 20, audio data, music data such as music, a lecture, a radio program, or the like, still image data such as a photograph, a document, a painting, a diagram, or the like, video data such as a movie, a television program, a video program, a game image, or the like, may be cited.

Now, the configuration of a radio frame used in the communication system 1 according to the present embodiment will be described with reference to FIG. 3.

Figure 3:
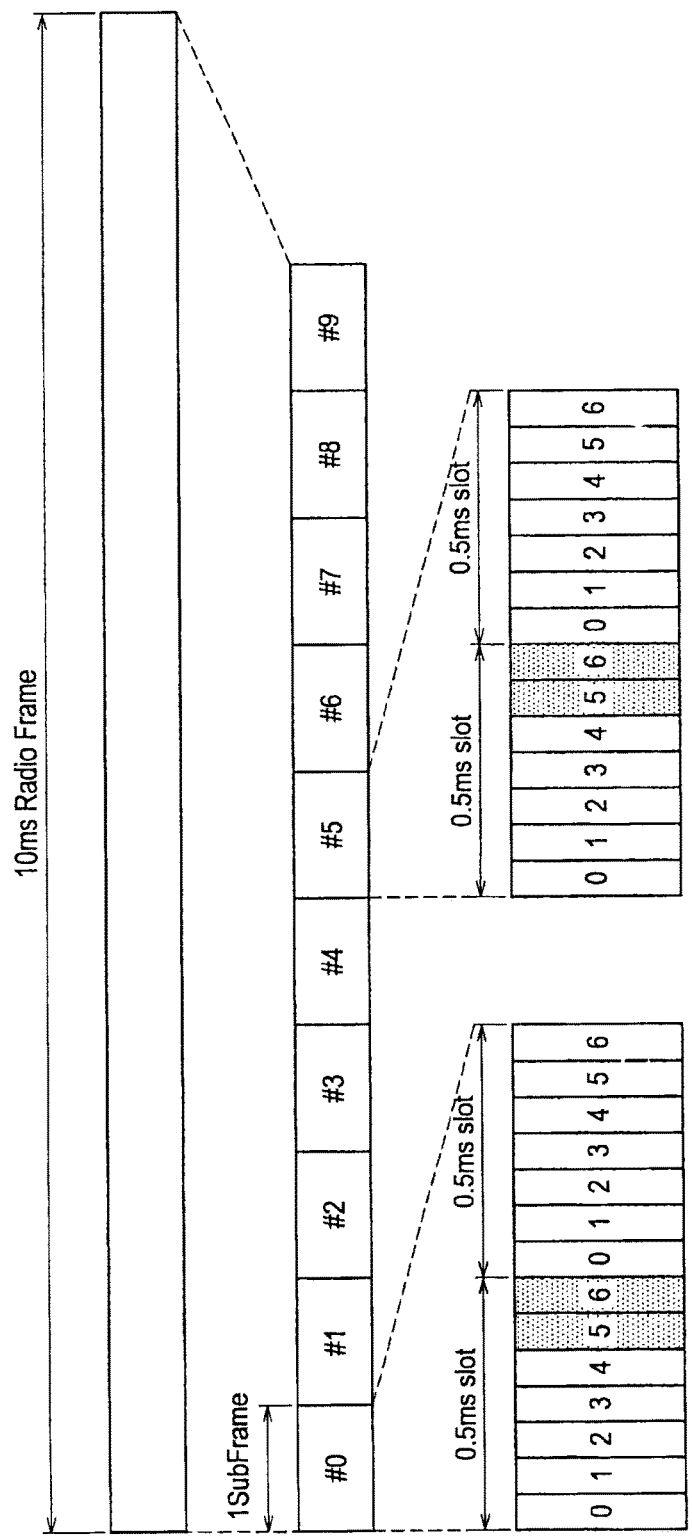
FIG. 3 is an explanatory diagram showing an example configuration of a radio frame used in the communication system according to the embodiment.

FIG. 3 is an explanatory diagram showing an example configuration of a radio frame used in the communication system 1 according to the present embodiment. As shown in FIG. 3, the length of each radio frame is 10 ms. Also, each radio frame is formed from ten subframes #0 to #9 whose lengths are 1 ms.

Also, each subframe is formed from two 0.5 ms slots, and each 0.5 ms slot is formed from seven OFDM (orthogonal frequency division multiplexing) symbols.

Also, the fifth and sixth OFDM symbols of the first 0.5 ms slots included in the subframes #0 and #5 are used for transmission of reference signals for synchronization. The mobile terminal 20 performs a cell search and a synchronization process based on this reference signal transmitted from the base station 10 or the relay station 30.

Additionally, the base station 10 allots time on a per-0.5 ms slot basis for communication with the mobile terminal 20. Furthermore, to separate the uplink and the downlink, FDD (Frequency Division Duplex) and TDD (Time Division Duplex) are used.

Next, operation modes of the mobile terminal 20 and the relay device 30 will be described.

(Operation Mode of Mobile Terminal)

Figure 4:
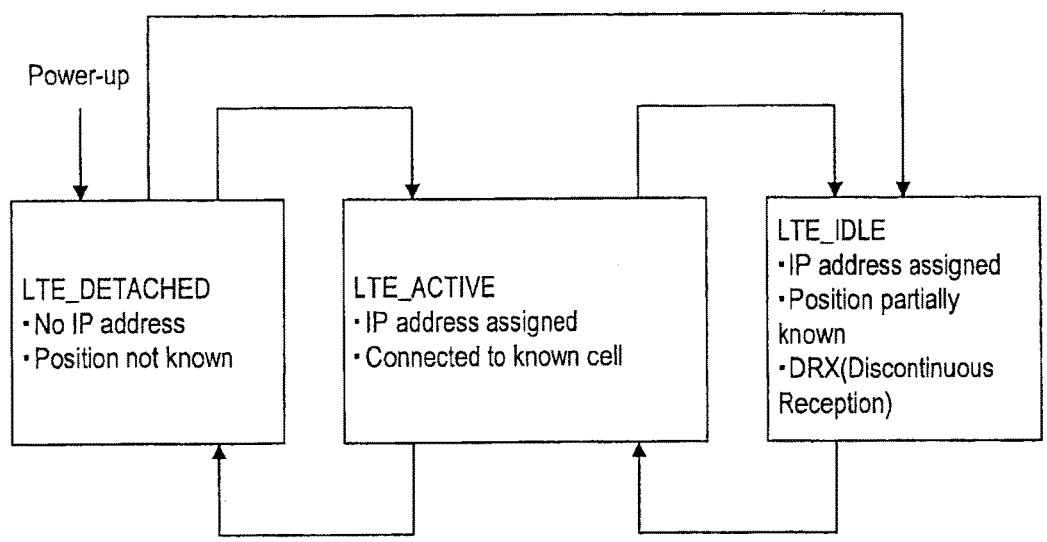
FIG. 4 is an explanatory diagram showing operation modes of a mobile terminal according to LTE.

FIG. 4 is an explanatory diagram showing operation modes of the mobile terminal 20 according to LTE. As shown in FIG. 4, the operation modes include $LTE_{13}$ DETACHED, $LTE_{13}$ ACTIVE, and LTE_IDLE.

After activation, the mobile terminal 20 goes into an operation mode called LTE_DETACHED. In LTE_DETACHED, an IP address is not assigned, and the belonging cell is unknown.

Then, the mobile terminal 20 shifts to LTE_ACTIVE (active mode). In the active mode, cell synchronization and setting of an IP address for the mobile terminal are performed. Also, both a state where the cell synchronization is achieved and a state where it is not achieved are included in the active mode. The mobile terminal 20 is capable of communication regardless of uplink or downlink as long as it is in a state where the cell synchronization is achieved.

Furthermore, to reduce power consumption, the mobile terminal 20 shifts from the active mode to LTE_IDLE (sleep mode). In the sleep mode, the mobile terminal 20 performs DRX (Discontinuous Reception). That is, the mobile terminal 20 intermittently receives, according to a predetermined cycle, signals transmitted from the base station 10. Therefore, according to the sleep mode, power consumption can be reduced.

When the mobile terminal 20 operates in this sleep mode, although the IP address is set, the network side including the base station 10 is not allowed to perceive the cell to which the mobile terminal 20 belongs. The network side perceives the location of the mobile terminal 20 at the granularity of a plurality of cells called a tracking area. Accordingly, the network side transmits to the cells in the tracking area, according to a DRX cycle, L1/L2 signaling in which paging information for paging the mobile terminal 20 is described.

On the other hand, the mobile terminal 20 receives, according to the DRX cycle, L1/L2 signaling in which downlink control information such as the paging information and the schedule information are described. Then, the mobile terminal 20 decides whether the mobile terminal 20 is being paged, that is, whether communication addressed to the mobile terminal 20 exists, based on the paging information or the schedule information, and shifts to the active mode if necessary.

Additionally, LTE-Advanced discussed in 3GPP is considered based on LTE. LTE is a communication scheme that is based on an OFDM demodulation scheme. Since OFDM uses subcarriers, each mobile terminal 20 can perform communication while avoiding interference by using a different subcarrier or a different time slot. More particularly, according to LTE, one resource block is defined by twelve subcarriers and seven OFDM symbols. Communication resources are allocated to each mobile terminal 20 on a per-resource-block basis.

(Operation Mode of Relay Device)

According to the present embodiment, since there are a plurality of relay devices 30 present in the cell provided by the base station 10, the sleep mode is implemented also in the relay devices 30 from the standpoint of power consumption reduction. In the case of operating in the sleep mode, the relay device 30 receives, according to the DRX cycle, L1/L2 signaling transmitted from the base station 10.

Furthermore, in the case of operating in the active mode, the relay device 30 decides presence or absence of communication addressed to the relay device 30 by referring to the schedule information included in the L1/L2 signaling transmitted at 1 ms intervals. Then, in the case there is no communication addressed to the relay device 30, the relay device 30 can be shifted to the sleep mode over a period when there is no communication addressed to the relay device 30.

Additionally, the distributed scheduling is also based on the scheduling by the base station 10. Accordingly, in the case neither the uplink nor the downlink is specified for the relay device 30 by the scheduling by the base station 10, neither the access link nor the relay link is used. Therefore, in the case neither the uplink nor the downlink is specified for the relay device 30, the direct link may exist but communication via the relay device 30 at least will not be performed, and the relay device 30 can shift to the sleep mode.

Background of Present Embodiment

The mobile terminal 20 determines its belonging base station 10 based on cell synchronization or reception intensity of signals transmitted from the base stations 10. Specifically, the mobile terminal 20 performs synchronization processing and measurement of reception intensity by using the reference signals transmitted in the fifth and sixth OFDM symbols in the first 0.5 ms slots included in subframes #0 and #5 shown in FIG. 3.

In the case of operating in the same way as LTE, a method is conceivable of the mobile terminal 20 receiving the reference signals transmitted from respective relay devices 30 and selecting the relay device 30 to be used based on the reception intensity of the reference signals. Additionally, the relay device 30 may transmit the reference signal in the slot designated by LTE or in another slot.

However, if the relay devices 30 operating in the sleep mode do not transmit reference signals, the mobile terminal 20 is not able to receive the reference signals from the relay devices 30 operating in the sleep mode, and thus it is difficult to appropriately select a relay device 30.

Furthermore, the reference as to whether a relay device 30 is to be used or not may be as follows.

If, when comparing the reception intensity of a signal transmitted by the mobile terminal 20 at the relay device 30 and at the base station 10, the reception intensity at the former is higher, the significance of performing relaying is great.

If the reception intensity at the base station 10 is higher, there is not much significance in performing relaying.

Also, if the difference between both reception intensities is small, there is not much significance in performing relaying.

Furthermore, even if the difference between both reception intensities is great, there is not much significance in performing relaying in the case the reception intensity at the base station 10 is sufficiently high. Additionally, the case the reception intensity is sufficiently high is a case where sufficient SNR can be obtained compared to the required SNR of the demodulation scheme that is used.

That is, if the relay device 30 is in the active mode, the base station 10 can decide whether use of the relay device 30 is effective or not by comparing the reception intensity at the relay device 30 and the reception intensity at the base station 10.

However, if the relay device 30 is in the sleep mode and the relay device 30 is not able to receive the signal transmitted by the mobile terminal 20, the base station 10 is not able to receive the reception intensity at the relay device 30, and thus it is difficult to appropriately decide whether use of the relay device 30 is effective or not.

Accordingly, the first embodiment and the second embodiment of the present invention have been achieved in view of the above-described background. According to the first embodiment and the second embodiment, a relay device 30 to be used for communication between the base station 10 and the mobile terminal 20 can be determined from one or more relay devices 30 having the sleep mode. In the following, the details of the first embodiment and the second embodiment will be described with reference to FIGS. 5 to 17.

2. First Embodiment

2-1. Configuration of Relay Device

Figure 5:
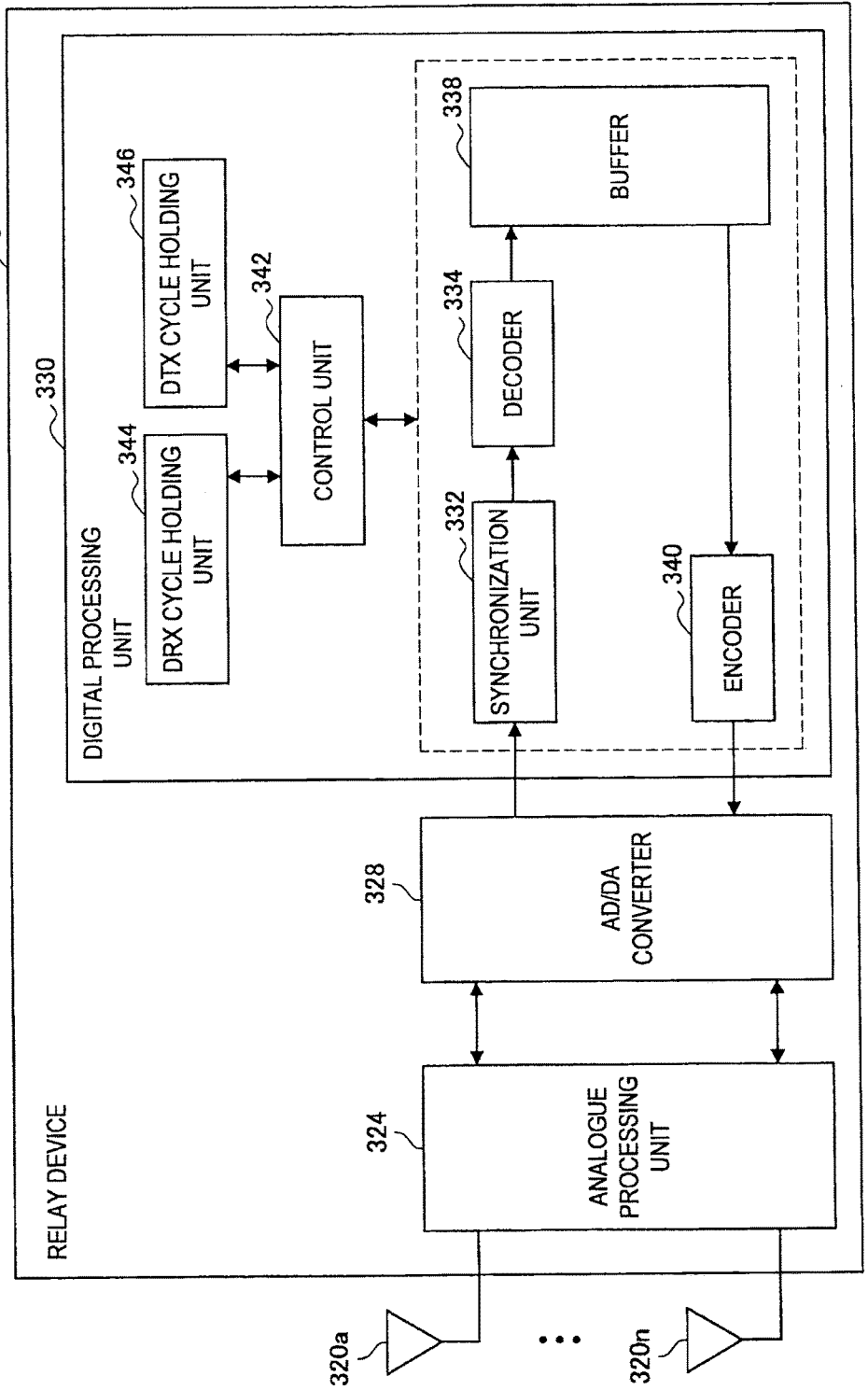
FIG. 5 is a functional block diagram showing a configuration of a relay device according to a first embodiment.

FIG. 5 is a functional block diagram showing the configuration of the relay device 30 according to the first embodiment. As shown in FIG. 5, the relay device 30 includes a plurality of antennas 320a to 320n, an analogue processing unit 324, an AD/DA converter 328, and a digital processing unit 330, and performs L2 relay.

Each of the plurality of antennas 320a to 320n receives a radio signal from the base station 10 or the mobile terminal 20 and acquires an electrical high-frequency signal, and supplies the high-frequency signal to the analogue processing unit 324. Also, each of the plurality of antennas 320a to 320n transmits a radio signal to the base station 10 or the mobile terminal 20 based on the high-frequency signal supplied from the analogue processing unit 324. Since the relay device 30 is provided with the plurality of antennas 320a to 320n as described, it is capable of performing MIMO (Multiple Input Multiple Output) communication or diversity communication.

The analogue processing unit 324 converts the high-frequency signals supplied from the plurality of antennas 320a to 320n into baseband signals by performing analogue processing such as amplification, filtering, down-conversion, or the like. Also, the analogue processing unit 324 converts a baseband signal supplied from the AD/DA converter 328 into a high-frequency signal.

The AD/DA converter 328 converts the analogue baseband signal supplied from the analogue processing unit 324 into a digital format, and supplies the same to the digital processing unit 330. Also, the AD/DA converter 328 converts a digital baseband signal supplied from the digital processing unit 330 into an analogue format, and supplies the same to the analogue processing unit 324.

The digital processing unit 330 includes a synchronization unit 332, a decoder 334, a buffer 338, an encoder 340, a control unit 342, a DRX cycle holding unit 344, and a DTX cycle holding unit 346. Among these, the synchronization unit 332, the decoder 334, the encoder 340, and the like function, together with the plurality of antennas 320a to 320n, the analogue processing unit 324, and the AD/DA converter 328, as a transmission unit and a reception unit for communicating with the base station 10 and the mobile terminal 20.

The synchronization unit 332 is supplied, from the AD/DA converter 328, with a reference signal transmitted from the base station 10, and performs a synchronization process of a radio frame based on the reference signal. Specifically, the synchronization unit 332 performs synchronization of the radio frame by computing the correlation between the reference signal and a known sequence pattern and detecting the peak position of the correlation.

The decoder 334 decodes a baseband signal supplied from the AD/DA converter 328 and obtains relay data for the base station 10 or the mobile terminal 20. Additionally, the decoding may include a MIMO reception process, an OFDM demodulation process, an error correction process, and the like, for example.

The buffer 338 temporarily holds the relay data, obtained by the decoder 334, for the base station 10 or the mobile terminal 20. Then, the relay data for the mobile terminal 20 is read out, by the control of the control unit 342, from the buffer 338 to the encoder 340 in the transmission time of the access downlink to the mobile terminal 20. Likewise, the relay data for the base station 10 is read out, by the control of the control unit 342, from the buffer 338 to the encoder 340 in the transmission time of the relay uplink to the base station 10.

The encoder 340 encodes the data supplied from the buffer 338, and supplies the same to the AD/DA converter 328. Additionally, the encoding may include a MIMO transmission process and an OFDM demodulation process, for example.

The control unit 342 controls transmission processing, reception processing, shifting of the operation mode, or the like of the relay device 30. Specifically, in the case the relay device 30 operates in the sleep mode, the control unit 342 controls the relay device 30 such that L1/L2 signaling is received according to the DRX cycle held in the DRX cycle holding unit 344. Then, the control unit 342 refers to the L1/L2 signaling decoded by the decoder 334, and in the case there is communication addressed to the relay device 30, shifts the operation mode to the active mode. The control unit 342 shifts the operation mode to the active mode also in the case an instruction to shift to the active mode is received from the base station 10.

Also, in the case the relay device 30 operates in the sleep mode, the control unit 342 controls the relay device 30 such that the reference signal is transmitted according to the DTX (Discontinuous Transmission) cycle held in the DTX cycle holding unit 346.

Figure 6:
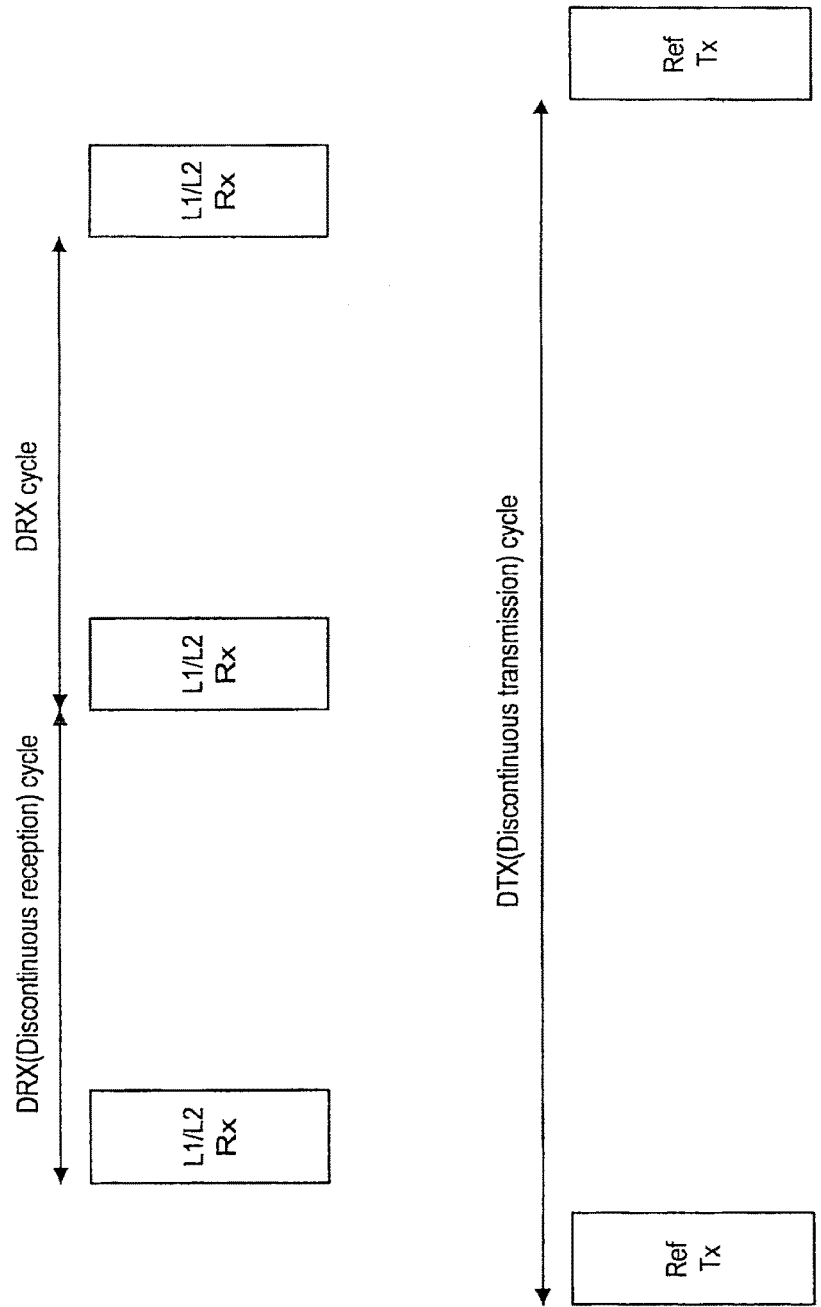
FIG. 6 is an explanatory diagram showing an operation of a relay device in sleep mode.

FIG. 6 is an explanatory diagram showing an operation of the relay device 30 in the sleep mode. As shown in FIG. 6, in the sleep mode, the relay device 30 receives the L1/L2 signaling according to the DRX cycle (L1/L2 Rx) and transmits the reference signal (RefTx) according to the DTX cycle.

More particularly, the relay device 30 may perform transmission of the reference signal in the fifth and sixth OFDM symbols in the first 0.5 ms slots included in subframes #0 and #5. Additionally, the relay device 30 may also transmit the reference signal only in one radio frame among ten radio frames, for example, instead of transmitting the reference signal in all the radio frames.

Also, each of the relay devices 30 transmits the reference signal using a different spreading code. Accordingly, the mobile terminal 20 is allowed to receive the reference signal from each relay device 30 by code division and to identify the relay device 30 which is the transmission source based on the spreading code that is being used.

2-2. Configuration of Mobile Terminal

Next, the configuration of the mobile terminal 20 will be described with reference to FIGS. 7 and 8.

Figure 7:
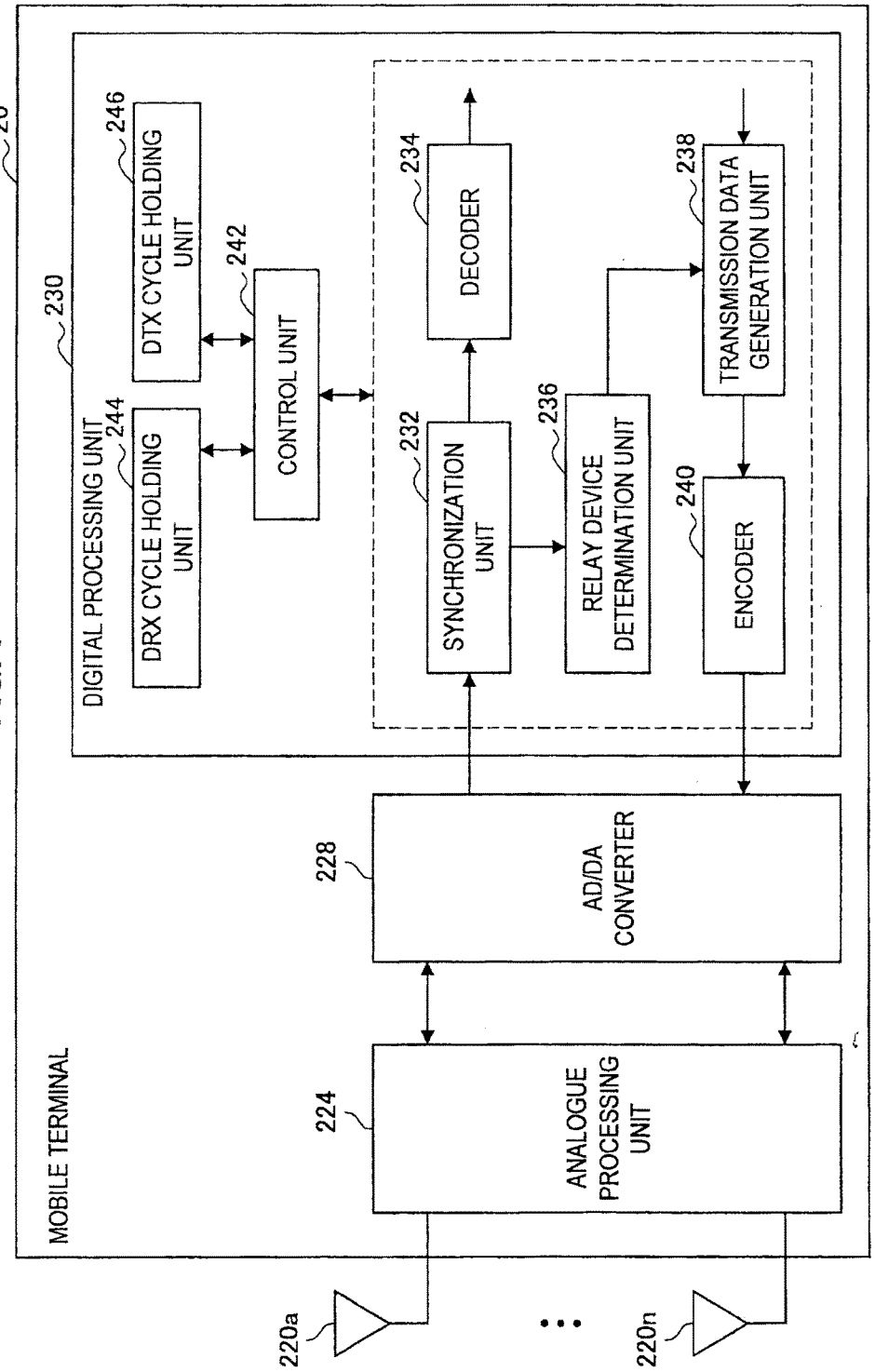
FIG. 7 is a functional block diagram showing a configuration of a mobile terminal according to the first embodiment.

FIG. 7 is a functional block diagram showing the configuration of the mobile terminal 20 according to the first embodiment. As shown in FIG. 7, the mobile terminal 20 includes a plurality of antennas 220a to 220n, an analogue processing unit 224, an AD/DA converter 228, and a digital processing unit 230.

Each of the plurality of antennas 220a to 220n receives a radio signal from the base station 10 or the relay device 30 and acquires an electrical high-frequency signal, and supplies the high-frequency signal to the analogue processing unit 224. Also, each of the plurality of antennas 220a to 220n transmits a radio signal to the base station 10 or the relay device 30 based on the high-frequency signal supplied from the analogue processing unit 224. Since the mobile terminal 20 is provided with the plurality of antennas 220a to 220n as described, it is capable of performing MIMO communication or diversity communication.

The analogue processing unit 224 converts the high-frequency signals supplied from the plurality of antennas 220a to 220n into baseband signals by performing analogue processing such as amplification, filtering, down-conversion, or the like. Also, the analogue processing unit 224 converts a baseband signal supplied from the AD/DA converter 228 into a high-frequency signal.

The AD/DA converter 228 converts the analogue baseband signal supplied from the analogue processing unit 224 into a digital format, and supplies the same to the digital processing unit 230. Also, the AD/DA converter 228 converts a digital baseband signal supplied from the digital processing unit 230 into an analogue format, and supplies the same to the analogue processing unit 224.

The digital processing unit 230 includes a synchronization unit 232, a decoder 234, a relay device determination unit 236, a transmission data generation unit 238, an encoder 240, a control unit 242, a DRX cycle holding unit 244, and a DTX cycle holding unit 246. Among these, the synchronization unit 232, the decoder 234, the encoder 240, and the like function, together with the plurality of antennas 220a to 220n, the analogue processing unit 224, and the AD/DA converter 228, as a transmission unit and a reception unit for communicating with the base station 10 and the relay device 30.

The synchronization unit 232 is supplied, from the AD/DA converter 228, with a reference signal transmitted from the base station 10 or the relay device 30, and performs a synchronization process of a radio frame based on the reference signal. Specifically, the synchronization unit 232 performs synchronization of the radio frame by computing the correlation between the reference signal and a known sequence pattern and detecting the peak position of the correlation.

The decoder 234 decodes a baseband signal supplied from the AD/DA converter 228 and obtains received data. Additionally, the decoding may include a MIMO reception process and an OFDM demodulation process, for example.

The relay device determination unit 236 determines a relay device 30 to be used for communication with the base station 10 from a plurality of relay devices 30 based on the magnitudes of the correlations of the reference signals obtained by the synchronization unit 232. Specifically, the relay device determination unit 236 may determine the relay device 30 which is the transmission source of the reference signal with the highest correlation as the relay device 30 to be used for the communication with the base station 10.

The transmission data generation unit 238 is supplied with information indicating the relay device 30 determined by the relay device determination unit 236, generates transmission data including this information, and supplies the same to the encoder 240.

The encoder 240 encodes the transmission data supplied from the transmission data generation unit 238, and supplies the same to the AD/DA converter 228. Additionally, the encoding may include a MIMO transmission process and an OFDM demodulation process, for example.

The control unit 242 controls transmission processing, reception processing and shifting of the operation mode of the mobile terminal 20. For example, in the case the mobile terminal 20 operates in the sleep mode, the control unit 242 controls the mobile terminal 20 such that L1/L2 signaling is received according to the DRX cycle held in the DRX cycle holding unit 244. Then, the control unit 242 refers to the L1/L2 signaling decoded by the decoder 234, and in the case there is communication addressed to the mobile terminal 20, shifts the operation mode to the active mode.

Furthermore, in the case of operating in the sleep mode, the control unit 242 performs control such that the mobile terminal 20 performs reception processing according to the DTX cycle held in the DTX cycle holding unit 246 to thereby receive the reference signal transmitted from the relay device 30 (including the relay device 30 operating in the sleep mode).

Figure 8:
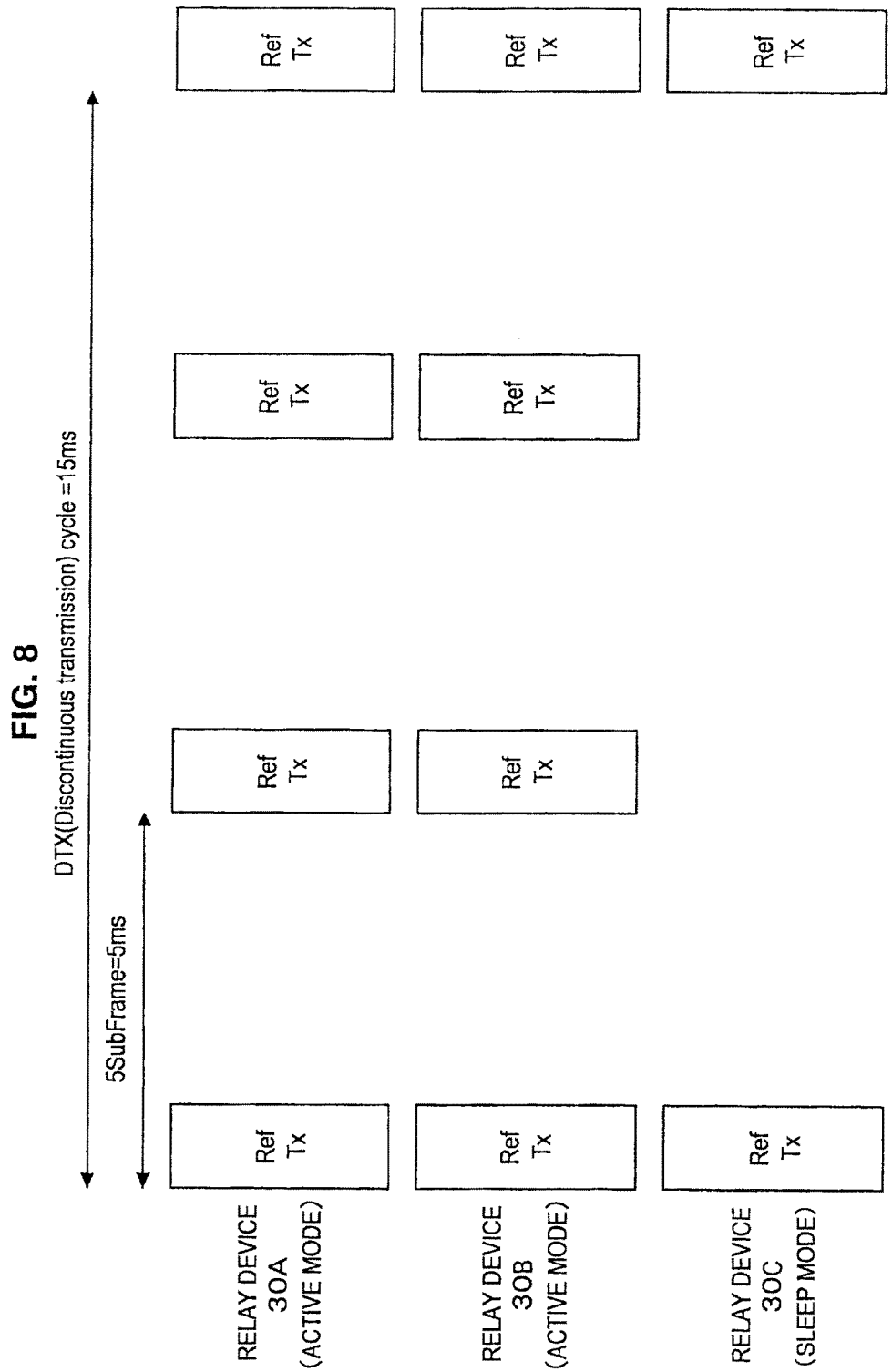
FIG. 8 is an explanatory diagram showing reception states, at a mobile terminal 20, of reference signals transmitted from a plurality of relay devices.

FIG. 8 is an explanatory diagram showing reception states, at the mobile terminal 20, of reference signals transmitted from a plurality of relay devices 30. As shown in FIG. 8, the mobile terminal 20 receives the reference signals from the relay devices 30A and 30B operating in the active mode at 5-subframe (5 ms) intervals. On the other hand, the mobile terminal 20 receives the reference signals from the relay device 30C operating in the sleep mode at 15-subframe (15 ms) intervals, for example, according to the DTX cycle held in the DTX cycle holding unit 246.

2-3. Configuration of Base Station

Next, the configuration of the base station 10 according to the first embodiment will be described with reference to FIG. 9.

Figure 9:
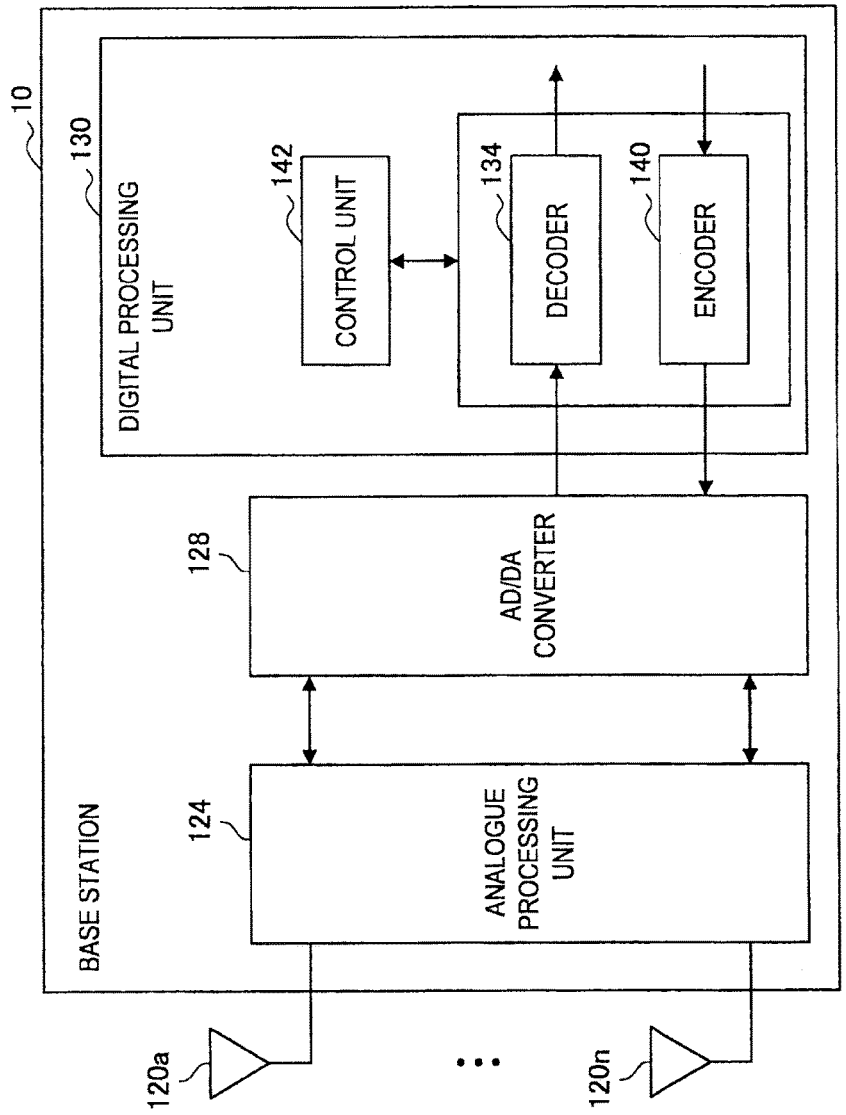
FIG. 9 is a functional block diagram showing a configuration of a base station according to the first embodiment.

FIG. 9 is a functional block diagram showing the configuration of the base station 10 according to the first embodiment. As shown in FIG. 9, the base station 10 includes a plurality of antennas 120a to 120n, an analogue processing unit 124, an AD/DA converter 128, and a digital processing unit 130.

Each of the plurality of antennas 120a to 120n receives a radio signal from the relay device 30 or the mobile terminal 20 and acquires an electrical high-frequency signal, and supplies the high-frequency signal to the analogue processing unit 124. Also, each of the plurality of antennas 120a to 120n transmits a radio signal to the relay device 30 or the mobile terminal 20 based on the high-frequency signal supplied from the analogue processing unit 124. Since the base station 10 is provided with the plurality of antennas 120a to 120n as described, it is capable of performing MIMO communication or diversity communication.

The analogue processing unit 124 converts the high-frequency signals supplied from the plurality of antennas 120a to 120n into baseband signals by performing analogue processing such as amplification, filtering, down-conversion, or the like. Also, the analogue processing unit 124 converts a baseband signal supplied from the AD/DA converter 128 into a high-frequency signal.

The AD/DA converter 128 converts the analogue baseband signal supplied from the analogue processing unit 124 into a digital format, and supplies the same to the digital processing unit 130. Also, the AD/DA converter 128 converts a digital baseband signal supplied from the digital processing unit 130 into an analogue format, and supplies the same to the analogue processing unit 124.

The digital processing unit 130 includes a decoder 134, an encoder 140, and a control unit 142. Among these, the decoder 134, the encoder 140, and the like function, together with the plurality of antennas 120a to 120n, the analogue processing unit 124, and the AD/DA converter 128, as a transmission unit and a reception unit for communicating with the relay device 30 and the mobile terminal 20.

The decoder 134 decodes a baseband signal supplied from the AD/DA converter 128 and obtains received data. Additionally, the decoding may include a MIMO reception process, an OFDM demodulation process, an error correction process, and the like, for example.

The encoder 140 encodes transmission data, and supplies the same to the AD/DA converter 128. Additionally, the encoding may include a MIMO transmission process and an OFDM demodulation process, for example.

The control unit 142 (mode control unit) controls transmission processing and reception processing of the base station 10, shifting of the operation mode of the relay device 30, or the like. For example, when information indicating the relay device 30 to be used for the communication with the base station 10 is received from the mobile terminal 20, if the relay device 30 is operating in the sleep mode, the control unit 142 issues an instruction by the L1/L2 signaling to shift to the active mode.

Here, since the relay device 30 receives the L1/L2 signaling according to the DRX cycle even when operating in the sleep mode, it shifts to the active mode according to the instruction from the base station 10 included in the L1/L2 signaling. As a result, the base station 10 and the mobile terminal 20 can communicate via the relay device 30 which has shifted to the active mode.

2-4. Operation of Communication System

In the foregoing, the configurations of the relay device 30, the mobile terminal 20, and the base station 10 have been described. Next, the operation of the communication system 1 according to the first embodiment will be described with reference to FIG. 10.

Figure 10:
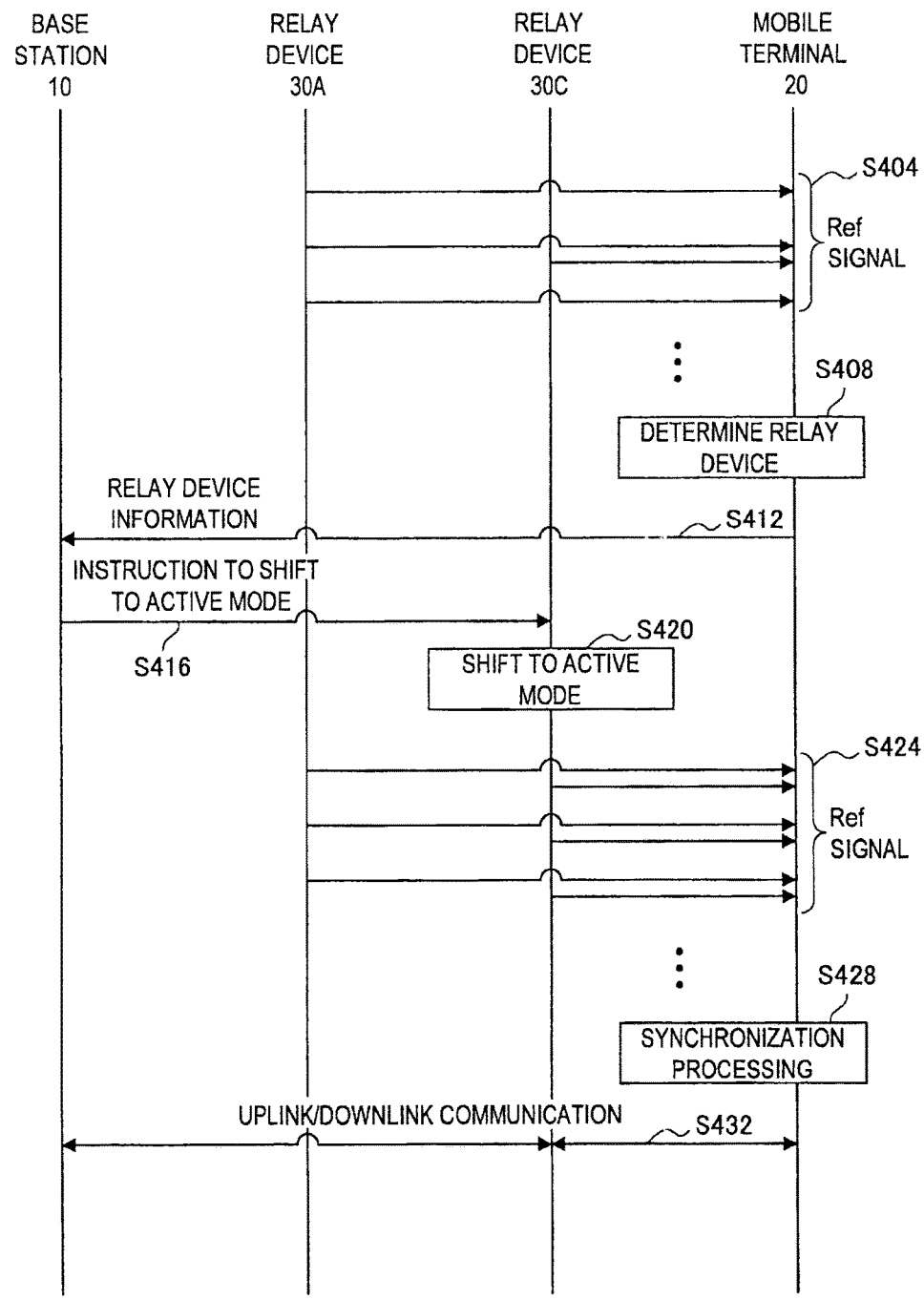
FIG. 10 is a sequence chart showing an operation of a communication system according to the first embodiment.

FIG. 10 is a sequence chart showing the operation of the communication system 1 according to the first embodiment. As shown in FIG. 10, each relay device 30 transmits the reference signal (S404). Here, the relay device 30C operating in the sleep mode transmits the reference signal according to the DTX cycle, and thus the frequency of transmitting the reference signals is lower than the relay device 30A operating in the active mode.

Then, the relay device determination unit 236 of the mobile terminal 20 acquires the reception intensity of the reference signal transmitted from each relay device 30 (magnitude of correlation), and determines a relay device 30 to be used for the communication with the base station 10 (S408). Additionally, the present sequence chart shows an example where the relay device 30C is determined as the relay device 30 to be used for the communication with the base station 10.

Then, the mobile terminal 20 notifies the base station 10 of information indicating the determined relay device 30C using the control channel of the uplink of the direct link (S412). Since the relay mode 30C notified by the mobile terminal 20 is in the sleep mode, the control unit 142 of the base station 10 transmits a control signal indicating shift from the sleep mode to the active mode using the L1/L2 signaling (S416).

The relay device 30C operating in the sleep mode monitors the L1/L2 signaling according to the DRX cycle, and in the case an instruction to shift from the sleep mode to the active mode is issued in the L1/L2 signaling, shifts to the active mode (S420). Then, the relay device 30C starts transmitting the reference signal at normal intervals (S424).

Subsequently, when a reference signal is received from the relay device 30C which has shifted to the active mode, the synchronization unit 232 of the mobile terminal 20 establishes synchronization of the radio frame (S428). Then, the mobile terminal 20 and the base station 10 are enabled to perform uplink communication and downlink communication using the relay device 30C (S432). Additionally, when the mobile terminal 20 that is synchronised with the relay device 30C no longer exists, the relay device 30C may shift from the active mode to the sleep mode based on an instruction from the base station 10.

3. Second Embodiment

In the foregoing, the first embodiment of the present invention has been described. Next, the second embodiment of the present invention will be described. Unlike the relay device 30 of the first embodiment, a relay device 30' of the second embodiment does not transmit a reference signal in the sleep mode. Therefore, the second embodiment is different from the first embodiment in other configurations as well, as will be described below.

3-1. Configuration of Relay Device

First, the configuration of the relay device 30' according to the second embodiment will be described with reference to FIG. 11.

Figure 11:
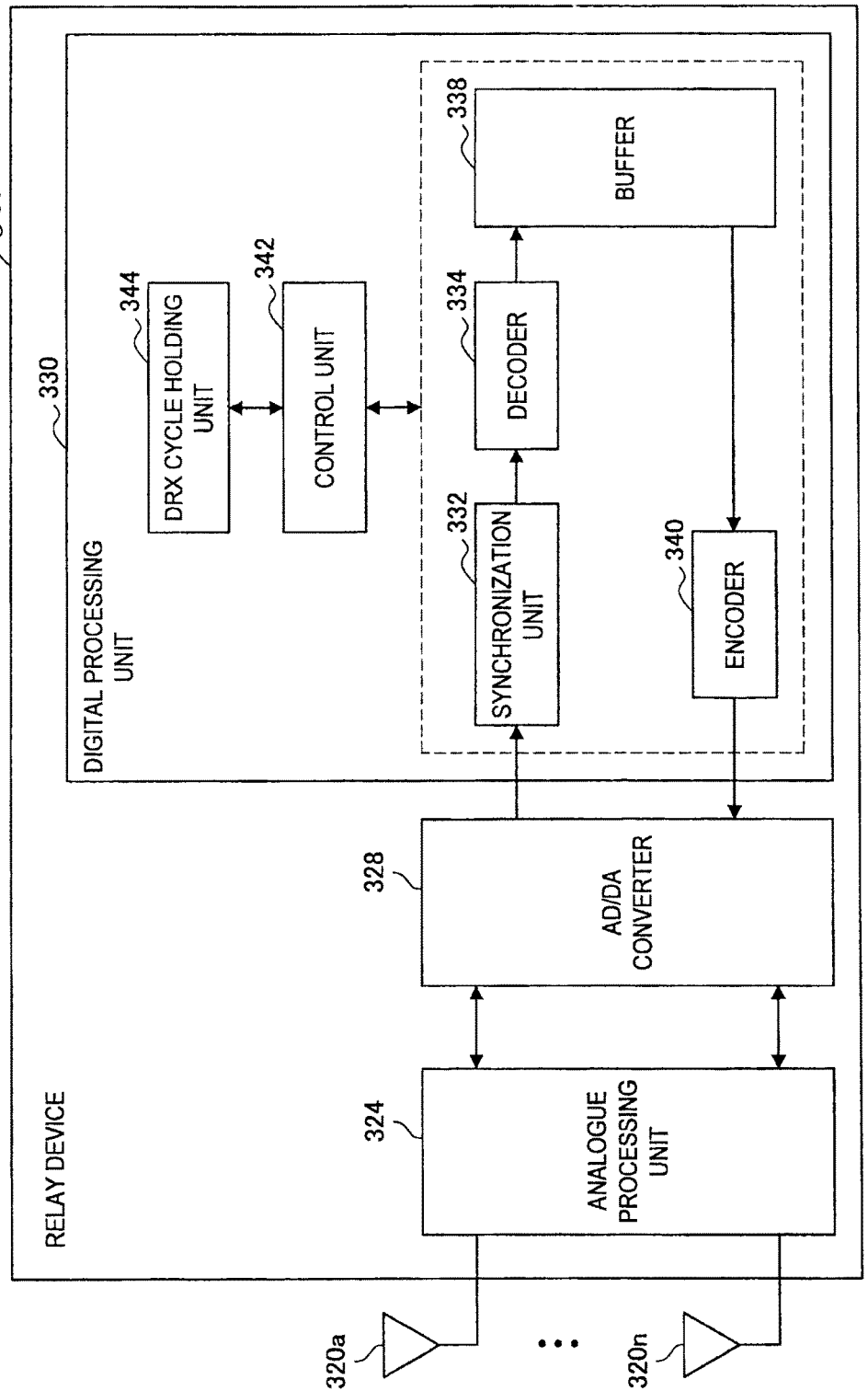
FIG. 11 is a functional block diagram showing a configuration of a relay device according to a second embodiment.

FIG. 11 is a functional block diagram showing the configuration of the relay device 30' according to the second embodiment. As shown in FIG. 11, the relay device 30' includes a plurality of antennas 320a to 320n, an analogue processing unit 324, an AD/DA converter 328, and a digital processing unit 330, and performs L2 relay. Also, the digital processing unit 330 includes a synchronization unit 332, a decoder 334, a buffer 338, an encoder 340, a control unit 342, and a DRX cycle holding unit 344.

Unlike the relay device 30 according to the first embodiment, the relay device 30' according to the second embodiment does not possess a DTX cycle holding unit 346. That is, in the sleep mode, the relay device 30' performs intermittent reception according to the DRX cycle, but does not transmit a reference signal.

Additionally, the plurality of antennas 320a to 320n, the analogue processing unit 324, the AD/DA converter 328, and the like can be configured to be substantially the same as the relay device 30 according to the first embodiment, and detailed description thereof is omitted.

3-2. Configuration of Mobile Terminal

Next, the configuration of a mobile terminal 20' according to the second embodiment will be described with reference to FIG. 12.

Figure 12:
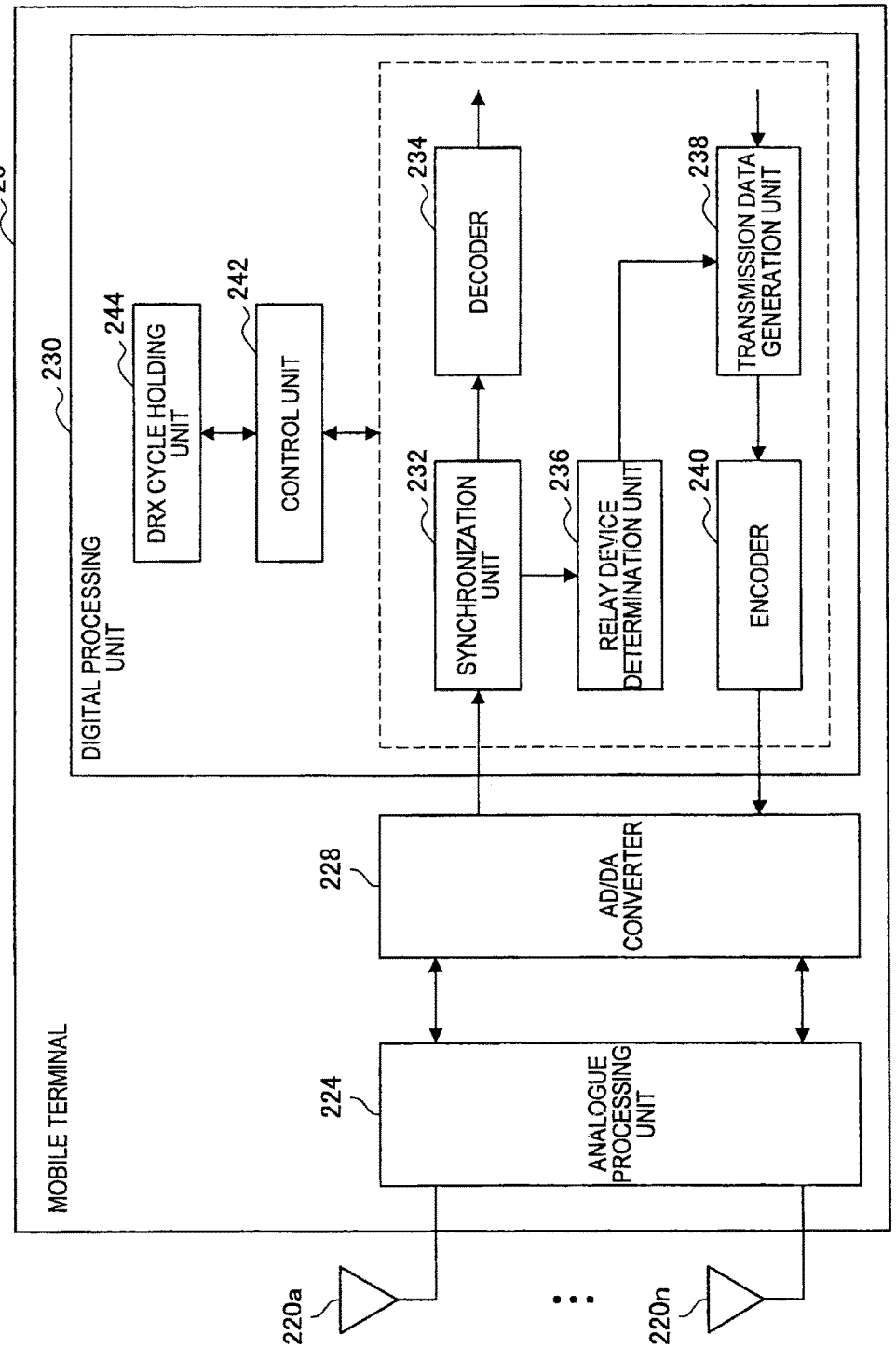
FIG. 12 is a functional block diagram showing a configuration of a mobile terminal according to the second embodiment.

FIG. 12 is a functional block diagram showing the configuration of the mobile terminal 20' according to the second embodiment. As shown in FIG. 12, the mobile terminal 20' includes a plurality of antennas 220a to 220n, an analogue processing unit 224, an AD/DA converter 228, and a digital processing unit 230. Also, the digital processing unit 230 includes a synchronization unit 232, a decoder 234, a relay device determination unit 236, a transmission data generation unit 238, an encoder 240, a control unit 242, and a DRX cycle holding unit 244.

As described above, the relay device 30' according to the second embodiment does not transmit a reference signal in the sleep mode. Therefore, the mobile terminal 20' according to the second embodiment does not possess a DTX cycle holding unit 346. That is, in the sleep mode, the mobile terminal 20' according to the second embodiment performs intermittent reception according to the DRX cycle but does not perform intermittent reception according to the DTX cycle.

Additionally, the plurality of antennas 220a to 220n, the analogue processing unit 224, the AD/DA converter 228, and the like can be configured to be substantially the same as the mobile terminal 20 according to the first embodiment, and detailed description thereof is omitted.

3-3. Configuration of Base Station

Next, the configuration of a base station 10' according to the second embodiment will be described with reference to FIG. 13.

Figure 13:
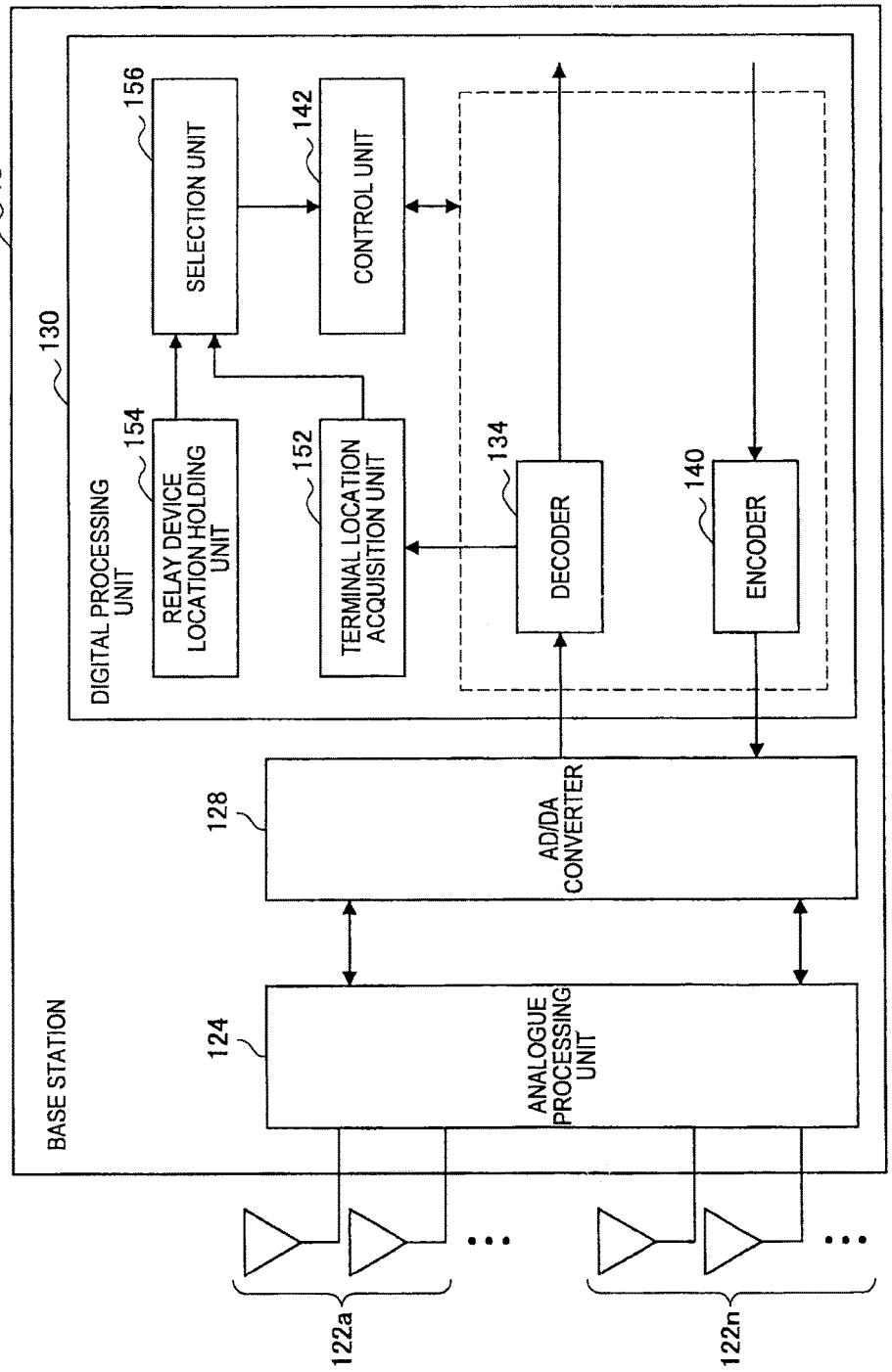
FIG. 13 is a functional block diagram showing a configuration of a base station according to the second embodiment.

FIG. 13 is a functional block diagram showing the configuration of the base station 10' according to the second embodiment. As shown in FIG. 13, the base station 10' includes groups of antennas 122a to 122n for respective sectors, an analogue processing unit 124, an AD/DA converter 128, and a digital processing unit 130.

A cell formed by the base station 10' is formed from a plurality of sectors, and each of the groups of antennas 122a to 122n performs transmission to the corresponding sector and reception from the corresponding sector. Additionally, the analogue processing unit 124, the AD/DA converter 128, and the like have to be compatible with sector communication, but basically they can be configured to be substantially the same as the base station 10 according to the first embodiment, and detailed description thereof is omitted.

The digital processing unit 130 includes a decoder 134, an encoder 140, a control unit 142, a terminal location acquisition unit 152, a relay device location holding unit 154, and a selection unit 156.

The terminal location acquisition unit 152 acquires information indicating the existing location of the mobile terminal 20'. Specifically, the terminal location acquisition unit 152 detects the arrival direction of a radio signal, that is the direction in which the mobile terminal 20' exists, based on which of the groups of antennas 122a to 122n received the radio signal transmitted from the mobile terminal 20'. Additionally, the detection method of the existing direction is not limited to the above, and an arrival direction estimation algorithm capable of electronically obtaining the directivity may also be used.

Also, the terminal location acquisition unit 152 detects the distance between the mobile terminal 20' and the base station 10' based on the reception intensity of a radio signal transmitted from the mobile terminal 20'. For example, the terminal location acquisition unit 152 may compare the transmission power of a radio signal by the mobile terminal 20' and the reception intensity of the radio signal at the base station 10' and detect the distance between the mobile terminal 20' and the base station 10' from the propagation loss. Additionally, a case where the mobile terminal 20' individually sets the transmission power is also conceivable, and thus a mobile terminal 20' may transmit information indicating the transmission power and the terminal location acquisition unit 152 may obtain the transmission power of a radio signal from this information. Additionally, the relationship between the propagation loss in the free space and the distance is expressed as the following formula 1, for example.

$$L=20 \log 10(4\pi d/\lambda)[dB] \quad \text{(Formula 1)}$$

d: distance
λ: wavelength

The terminal location acquisition unit 152 can perceive the existing location of the mobile terminal 20' by detecting the existing direction and the distance to the base station 10' of the mobile terminal 20' in the above manner. Additionally, since the reception timing by the base station 10' of a signal transmitted by the mobile terminal 20' differs according to the distance between the base station 10' and the mobile terminal 20', the terminal location acquisition unit 152 may estimate the distance to the mobile terminal 20' based on this reception timing.

Furthermore, the relay device location holding unit 154 holds location information of each relay device 30'. The base station 10' may acquire the location information of each relay device 30' by detecting the distance between the existing direction and the distance to the base station 10' of a relay device 30' in the above manner based on a signal transmitted from the relay device 30' in the active mode, for example.

The selection unit 156 refers to the location information of the mobile terminal 20' acquired by the terminal location acquisition unit 152 and the location information of each relay device 30' held by the relay device location holding unit 154, and selects a relay device 30' suitable for communication with the mobile terminal 20'. For example, the selection unit 156 selects a relay device 30' that is nearest to the mobile terminal 20'.

The control unit 142 issues an instruction to shift to the active mode by L1/L2 signaling, in the case the relay device 30' selected by the selection unit 156 is operating in the sleep mode. The relay device 30' receives the L1/L2 signaling according to the DRX cycle even when operating in the sleep mode, and thus shifts to the active mode according to the instruction from the base station 10' included in the L1/L2 signaling. As a result, the relay device 30' starts transmission of reference signal, and the mobile terminal 20' is allowed to determine the relay device 30' to be used for the communication with the base station 10' based on the reference signal transmitted by the relay device 30'.

3-4. Operation of Communication System

In the foregoing, the configurations of the relay device 30', the mobile terminal 20', and the base station 10' have been described. Next, the operation of the communication system according to the second embodiment will be described with reference to FIG. 14.

Figure 14:
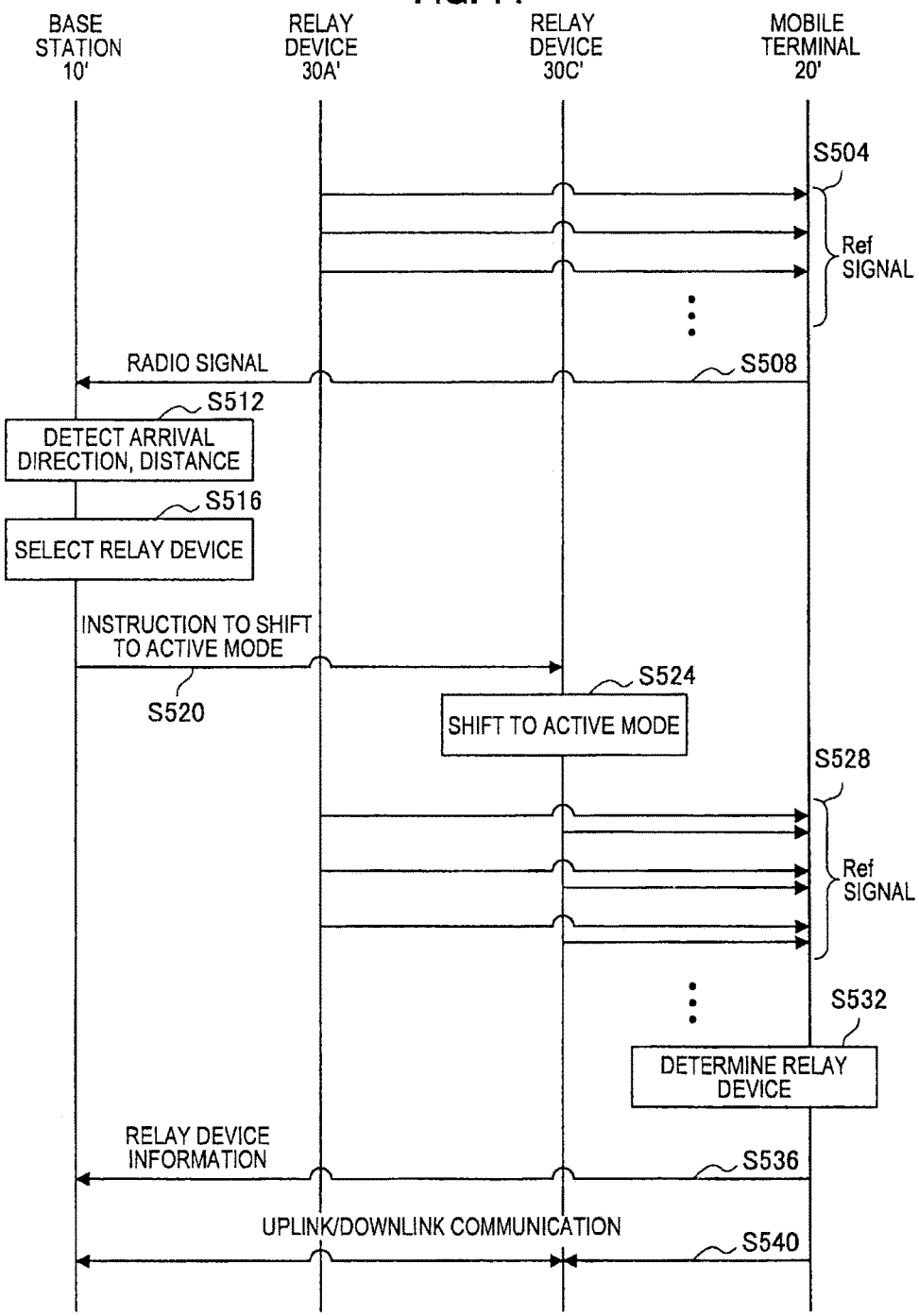
FIG. 14 is a sequence chart showing an operation of a communication system according to the second embodiment.

FIG. 14 is a sequence chart showing the operation of the communication system according to the second embodiment. As shown in FIG. 14, the relay device 30'A operating in the active mode transmits a reference signal and the relay device 30'C operating in the sleep mode does not transmit a reference signal (S504). When the mobile terminal 20' transmits a radio signal here (S508), the terminal location acquisition unit 152 of the base station 10' estimates the location of the mobile terminal 20' by detecting the arrival direction of this radio signal and the distance to the mobile terminal 20' (S512).

Furthermore, the selection unit 156 of the base station 10' selects the relay device 30' that is near the mobile terminal 20' (S516). Here, it is assumed that the selection unit 156 of the base station 10' selected the relay device 30'C. In this case, since the relay device 30'C is in the sleep mode, the control unit 142 of the base station 10' transmits a control signal indicating shift from the sleep mode to the active mode using L1/L2 signaling (S520).

The relay device 30'C operating in the sleep mode monitors the L1/L2 signaling according to the DRX cycle, and in the case an instruction to shift from the sleep mode to the active mode is issued in the L1/L2 signaling, shifts to the active mode (S524). Then, the relay device 30'C starts transmission of the reference signal (S528).

Then, the relay device determination unit 236 of the mobile terminal 20' acquires the reception intensity of the reference signal transmitted from each relay device 30' (magnitude of correlation), and determines a relay device 30' to be used for the communication with the base station 10' (S532). Here, it is assumed that the relay device selection unit 236 of the mobile terminal 20' determined to use the relay device 30'C for the communication with the base station 10'. In this case, the mobile terminal 20' notifies the base station 10' of the information indicating the determined relay device 30'C using the control channel of the uplink of the direct link (S536).

As a result, the mobile terminal 20' and the base station 10' are enabled to perform uplink communication and downlink communication using the relay device 30'C based on the scheduling by the base station 10' (S540). Additionally, when the mobile terminal 20' that is synchronised with the relay device 30'C no longer exists, the relay device 30'C may shift from the active mode to the sleep mode based on an instruction from the base station 10'.

3-5. Modified Example 1

In the foregoing, the second embodiment has been described. However, the acquisition method of the location information of the mobile terminal 20' by the terminal location acquisition unit 152 of the base station 10' is not limited to the above example. In the following, modified examples 1 to 4 of the acquisition method of the location information of the mobile terminal 20' by the terminal location acquisition unit 152 will be described.

Figure 15:
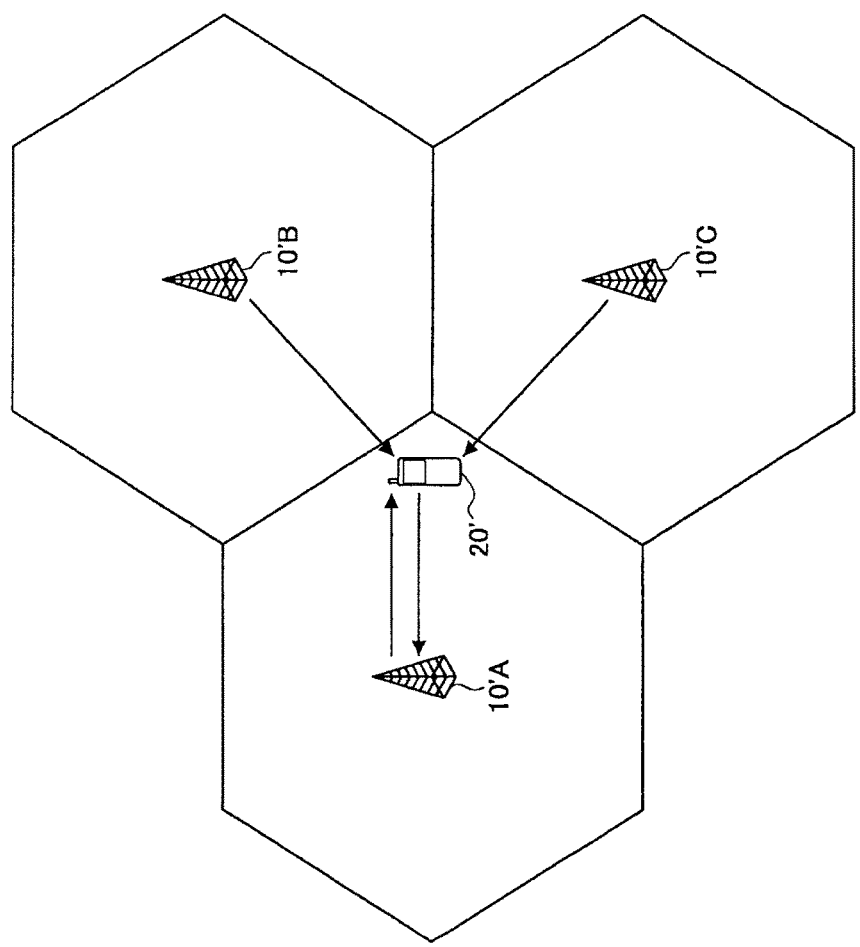
FIG. 15 is an explanatory diagram showing a modified example 1 of an acquisition method of location information of a mobile terminal.

FIG. 15 is an explanatory diagram showing a modified example 1 of the acquisition method of the location information of the mobile terminal 20'. As shown in FIG. 15, according to the modified example 1, although the mobile terminal 20' belongs to the base station 10'A, it also receives the reference signals transmitted by the base stations 10'B and 10'C. Then, the mobile terminal 20' measures the reception intensity of the reference signal transmitted by each base station 10' and transmits reception intensity information obtained by the measurement to the base station 10'A.

The terminal location acquisition unit 152 of the base station 10'A estimates the location of the mobile terminal 20' based on the reception intensity information received from the mobile terminal 20'. For example, the terminal location acquisition unit 152 may estimate the distance from each base station 10' to the mobile terminal 20' based on the reception intensity at the mobile terminal 20' of the reference signal transmitted from each base station 10', and estimate the location satisfying each of the estimated distances as the location of the mobile terminal 20'.

3-6. Modified Example 2

Figure 16:
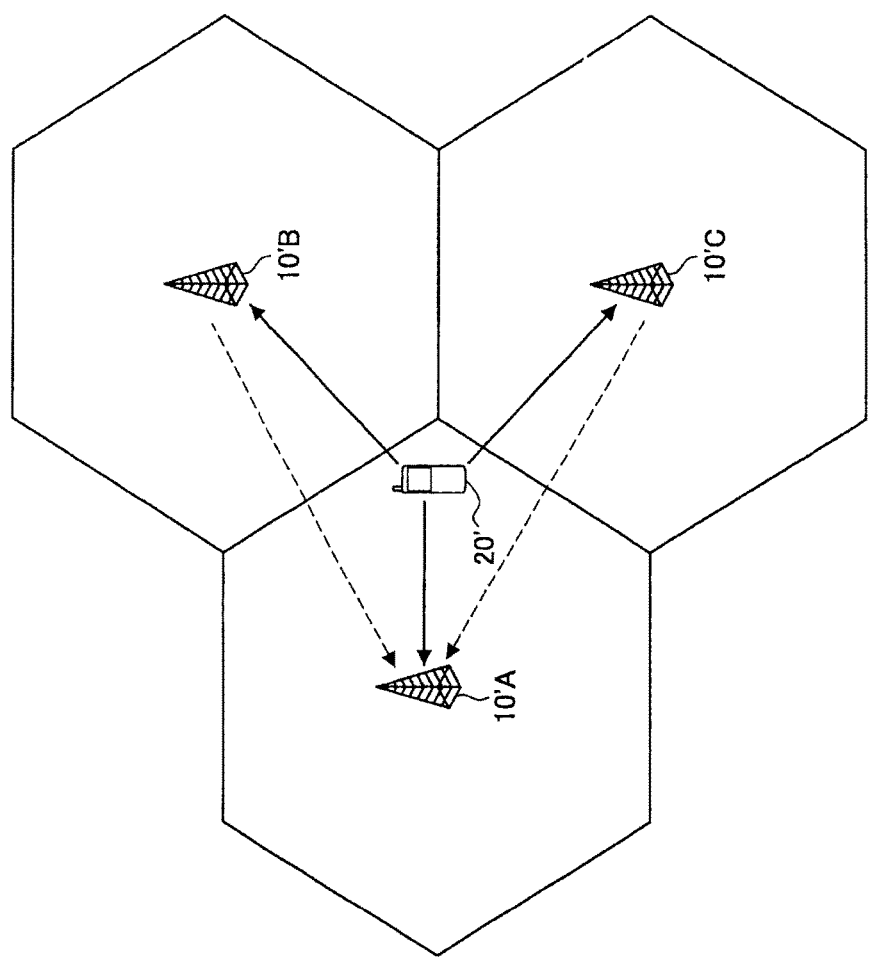
FIG. 16 is an explanatory diagram showing a modified example 2 of an acquisition method of location information of a mobile terminal.

FIG. 16 is an explanatory diagram showing a modified example 2 of the acquisition method of the location information of the mobile terminal 20'. As shown in FIG. 16, according to the modified example 2, not only the base station 10'A but also the base stations 10'B and 10'C receive the radio signal transmitted by the mobile terminal 20' belonging to the base station 10'A. Then, each base station 10' estimates the direction and distance of the mobile terminal 20' based on the radio signal received from the mobile terminal 20'. Furthermore, the base stations 10'B and 10'C transmit information related to the estimated location of the mobile terminal 20' to the base station 10'A via the backbone network 12.

Accordingly, the terminal location acquisition unit 152 of the base station 10'A can acquire the location information of the mobile terminal 20' by combining the pieces of information related to the location of the mobile terminal 20' estimated by the base stations 10'. Additionally, the base stations 10'B and 10'C may transmit to the base station 10'A only the reception intensity of the radio signal received from the mobile terminal 20', and the base station 10'A may estimate the location of the mobile terminal 20' from this reception intensity information.

3-7. Modified Example 3

Figure 17:
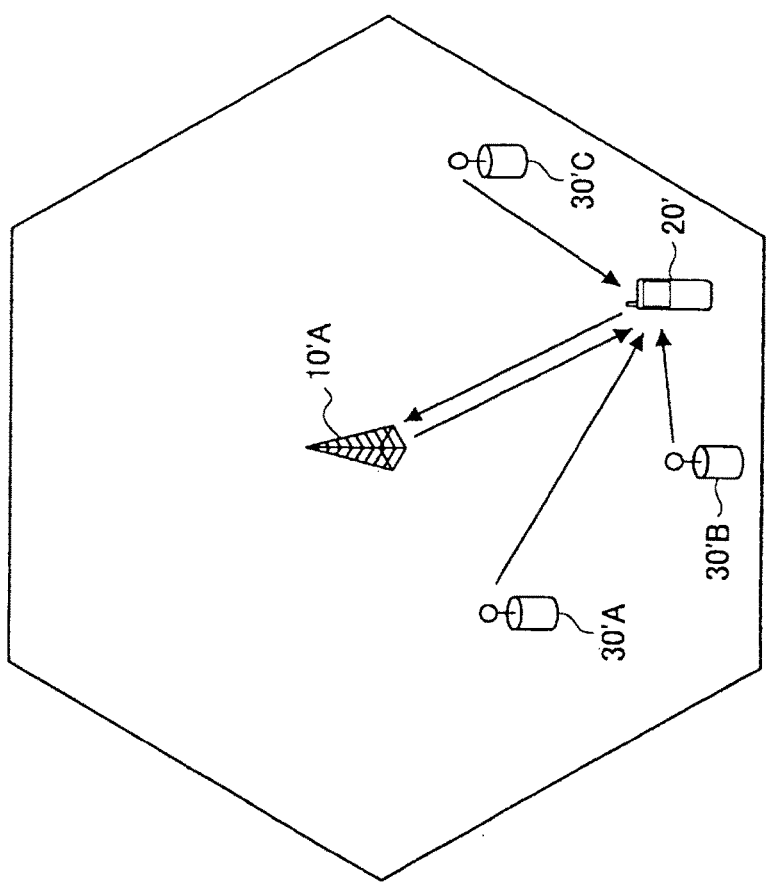
FIG. 17 is an explanatory diagram showing a modified example 3 of an acquisition method of location information of a mobile terminal.

FIG. 17 is an explanatory diagram showing a modified example 3 of the acquisition method of the location information of the mobile terminal 20'. As shown in FIG. 17, according to the modified example 3, the mobile terminal 20' receives the reference signals transmitted from the base station 10'A and each relay device 30' operating in the active mode. Then, the mobile terminal 20' measures the reception intensity of the reference signals transmitted by the base station 10'A and each relay device 30' and transmits reception intensity information obtained by the measurement to the base station 10'A.

The terminal location acquisition unit 152 of the base station 10'A estimates the location of the mobile terminal 20' based on the reception intensity information received from the mobile terminal 20'. For example, the terminal location acquisition unit 152 may estimate the distances from the base station 10'A and each relay device 30' to the mobile terminal 20' based on the reception intensity at the mobile terminal 20' of the reference signals transmitted from the base station 10'A and each relay device 30', and estimate the location satisfying each of the estimated distances as the location of the mobile terminal 20'.

3-8. Modified Example 4

Furthermore, according to a modified example 4, the mobile terminal 20' possesses a GPS (Global Positioning System) receiving function. The mobile terminal 20' acquires the location information of the mobile terminal 20' using this GPS receiving function, and transmits the acquired location information to the base station 10'. As a result, the terminal location acquisition unit 152 of the base station 10' is enabled to obtain the location information of the mobile terminal 20'.

4. Summary

As described above, according to the first embodiment of the present invention, a relay device 30 operating in the sleep mode also transmits reference signals according to the DRX cycle. Therefore, the mobile terminal 20 can receive the reference signal not only from a relay device 30 operating in the active mode but also from a relay device 30 operating in the sleep mode. Accordingly, the mobile terminal 20 is enabled to determine a relay device 30 to be used for the communication with the base station 10 from a plurality of relay devices 30 including the relay device 30 operating in the sleep mode, and to perform communication via the determined relay device 30.

Also, according to the second embodiment of the present invention, the base station 10' causes a relay device 30' operating in the sleep mode near the mobile terminal 20' to shift to the active mode. Accordingly, the mobile terminal 20' becomes enabled to receive the reference signal also from the relay device 30' which was operating in the sleep mode, and to more appropriately determine the relay device 30' to be used for the communication with the base station 10'.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the steps of the processing of the communication system 1 of the present specification do not necessarily have to be processed chronologically according to the order described as the sequence chart. For example, the steps of the processing of the communication system 1 may be processed according to an order different from the order shown as the sequence chart or may be processed in parallel.

Furthermore, a computer program for causing hardware, such as a CPU, a ROM, a RAM, or the like, installed in the base station 10, the mobile terminal 20, or the relay device 30 to realize the same function as each component of the above-described base station 10, the mobile terminal 20, or the relay device 30 can also be created. Furthermore, a storage medium storing the computer program is also provided.

The invention claimed is:

1. A mobile terminal comprising:
   a receiver configured to receive at least a first reference signal and a second reference signal transmitted from one or more communication devices; and
   a transmitter configured to transmit, to a base station, reception intensity information corresponding to each signal transmitted from a plurality of base stations, wherein
   the one or more communication devices are configured to
      transmit the first reference signal according to a first cycle on a first downlink transmission operated as a power save state and transmit the second reference signal according to a second cycle on a second downlink transmission operated as an active state, the first cycle being longer than the second cycle, and
      perform discontinuous reception in a case that any one of the one or more communication devices is operating in the power save mode.

2. The mobile terminal of claim 1, wherein the transmitted reception intensity information further corresponds to each signal transmitted from the one or more communication devices.

3. The mobile terminal of claim 1, wherein the transmitter is further configured to transmit, to the base station, location information corresponding to the mobile device estimated by GPS.

4. The mobile terminal of claim 1, wherein the one or more communication devices are configured to:
   receive an indication from the base station while performing the discontinuous reception.

5. The mobile terminal of claim 1, wherein the first cycle is a discontinuous transmission (DTX) cycle.

6. The mobile terminal of claim 1, wherein the first cycle is longer than a length of a sub-frame.

7. The mobile terminal of claim 1, wherein the first cycle is longer than a length of 10 sub-frames.

8. A communication device, comprising:
   a communication interface configured to communicate with at least one of a base station and a mobile terminal; and
   circuitry configured to
      control transmitting, to a base station, reception intensity information corresponding to each signal transmitted from a plurality of base stations,
      control transmitting a first reference signal according to a first cycle and a second reference signal according to a second cycle, the first cycle being longer than the second cycle, wherein the first reference signal is transmitted on a first downlink transmission operated as the power save state and the second reference signal is transmitted on a second downlink transmission operated as the active state, and
      perform discontinuous reception in a case that any one of the one or more communication devices is operating in the power save mode.

9. The communication device of claim 8, wherein the first cycle is a discontinuous transmission (DTX) cycle.

10. The communication device of claim 8, wherein the first cycle is longer than a length of a sub-frame.

11. The communication device of claim 8, wherein the first cycle is longer than a length of 10 sub-frames.

12. The communication device of claim 8, wherein the first reference signal is used for synchronization.

13. A communication device, comprising:
   a communication interface configured to communicate with a base station and a mobile terminal; and
   circuitry configured to
      control transmitting a first reference signal according to a first cycle or a second reference signal according to a second cycle, the first cycle being longer than the second cycle, wherein the first reference signal is transmitted on a first downlink transmission operated as the power save state and the second reference signal is transmitted on a second downlink transmission operated as the active state, wherein
   the communication interface is configured to
      perform discontinuous reception in a case that the communication device is operating in the power save mode; and
   receive an indication from the base station while performing the discontinuous reception.

* * * * *